United States Patent
Stockall et al.

(10) Patent No.: US 12,495,839 B2
(45) Date of Patent: Dec. 16, 2025

(54) METHOD, APPARATUSES AND COMPUTER PROGRAM PRODUCT FOR ENABLING OPERATION OF AN AEROSOL GENERATION DEVICE

(71) Applicant: JT International S.A., Geneva (CH)

(72) Inventors: Adrian Peter Stockall, Le Grand-Saconnex (CH); Magd Kudama Al Mudaris, London (GB); Jonathan Ruiz Peinado, London (GB)

(73) Assignee: JT International SA (CH)

( * ) Notice: Subject to any disclaimer, the term of this patent is extended or adjusted under 35 U.S.C. 154(b) by 637 days.

(21) Appl. No.: 17/626,680

(22) PCT Filed: Jul. 24, 2020

(86) PCT No.: PCT/EP2020/071039
§ 371 (c)(1),
(2) Date: Jan. 12, 2022

(87) PCT Pub. No.: WO2021/023533
PCT Pub. Date: Feb. 11, 2021

(65) Prior Publication Data
US 2022/0279860 A1   Sep. 8, 2022

(30) Foreign Application Priority Data

Aug. 2, 2019   (EP) .................................. 19189885

(51) Int. Cl.
*A24F 40/65*   (2020.01)
*A24F 40/53*   (2020.01)
(Continued)

(52) U.S. Cl.
CPC ............. *A24F 40/65* (2020.01); *A24F 40/53* (2020.01); *H04L 9/3073* (2013.01); *H04L 9/3247* (2013.01); *H04W 76/15* (2018.02)

(58) Field of Classification Search
CPC .......... A24F 40/65; A24F 40/53; A24F 40/40; A24F 40/46; A24F 40/50; H04L 9/3073;
(Continued)

(56) References Cited

U.S. PATENT DOCUMENTS

2018/0093054 A1   4/2018   Bowen et al.
2019/0158938 A1*  5/2019   Bowen .................. A61M 15/06
(Continued)

FOREIGN PATENT DOCUMENTS

WO   2014199233 A2   12/2014

OTHER PUBLICATIONS

International Search Report for Application No. PCT/EP2020/071039 mailed Oct. 12, 2020, pp. 1-4.

*Primary Examiner* — Christopher M Brandt
(74) *Attorney, Agent, or Firm* — Lerner David LLP

(57) ABSTRACT

A method of enabling an operation of an aerosol generation device including at the aerosol generation device: determining whether an aerosol generation device held operation enablement message is valid or invalid, and enabling the operation if the aerosol generation device held operation enablement message is determined to be valid, at the personal computing device attempting to obtain a server generated operation enablement message, transmitting the server generated operation enablement message to the aerosol generation device if the server generated operation enablement message is obtained, and generating a personal computing device generated operation enablement message and transmitting the personal computing device operation enablement message to the aerosol generation device if the server generated operation enablement message is not obtained. The aerosol generation device uses whichever of the operation enablement messages it receives from the
(Continued)

personal computing device as the aerosol generation device held operation enablement message.

20 Claims, 17 Drawing Sheets

(51) Int. Cl.
*H04L 9/30* (2006.01)
*H04L 9/32* (2006.01)
*H04W 76/15* (2018.01)

(58) Field of Classification Search
CPC .... H04L 9/3247; H04W 76/15; H04W 12/50; H04W 12/72; H04W 4/80; H04W 12/08; H04W 12/61; A61M 16/202; A61M 2016/0021; A61M 16/024; A61M 2016/0027; A61M 2016/0033; A61M 2202/0208; A61M 2205/3561; A61M 2205/8206; A61M 2209/01; A61M 2209/088; A61M 16/101
See application file for complete search history.

(56) References Cited

U.S. PATENT DOCUMENTS

| | | | |
|---|---|---|---|
| 2019/0174266 A1* | 6/2019 | Baker | A24F 40/95 |
| 2021/0022407 A1* | 1/2021 | Moloney | A24F 40/65 |
| 2021/0271743 A1* | 9/2021 | Jung | H04W 12/041 |

* cited by examiner

700

```
┌─────────────────────────────────────────┐
│            Launch PWA                    │─702
└─────────────────────────────────────────┘
                    │
                    ▼
┌─────────────────────────────────────────┐
│ Access browser storage of web browser   │─704
│ comprising one or more consumer          │
│ apparatus identifiers                    │
└─────────────────────────────────────────┘
                    │
                    ▼
┌─────────────────────────────────────────┐
│ Determine an aerosol generation device  │─706
│ with which to communicate                │
└─────────────────────────────────────────┘
                    │
                    ▼
┌─────────────────────────────────────────┐
│ Retrieve consumer apparatus identifier  │─708
│ of to the selected aerosol generation    │
│ device                                   │
└─────────────────────────────────────────┘
                    │
                    ▼
┌─────────────────────────────────────────┐
│ Initiate short-range wireless            │─710
│ communication connection between         │
│ personal computing device and selected   │
│ aerosol generation device                │
└─────────────────────────────────────────┘
```

```
┌─────────────────────────────────────────┐
│ Receive configuration information        │─802
│ regarding the functioning of aerosol     │
│ generation device from aerosol           │
│ generation device                        │
└─────────────────────────────────────────┘
                    │
                    ▼
┌─────────────────────────────────────────┐
│ Store configuration information from    │─804
│ browser storage of the web browser       │
└─────────────────────────────────────────┘
                    │
                    ▼
┌─────────────────────────────────────────┐
│ Determine connection to remote server   │─806
│ is available                             │
└─────────────────────────────────────────┘
                    │
                    ▼
┌─────────────────────────────────────────┐
│ Transmit configuration information to   │─808
│ the remote server                        │
└─────────────────────────────────────────┘
```

- Receive operation enablement message — 902
- Verify verifiable data of the operation enablement message — 904
- Enable operation of the aerosol generation device if verification is successful — 906

- Enable operation of aerosol generation device — 1002
- Start disable timer — 1004
- Disable timer triggers after timer runs out — 1006
- Disable operation of aerosol generation device — 1008
- Send operation enablement request — 1010
- Receive operation enablement message — 1012
- Verify verifiable data of operation enablement message — 1014
- Re-enable operation of aerosol generation device — 1016

*FIG. 10*

METHOD, APPARATUSES AND COMPUTER PROGRAM PRODUCT FOR ENABLING OPERATION OF AN AEROSOL GENERATION DEVICE

CROSS-REFERENCE TO RELATED APPLICATIONS

The present application is a national phase entry under 35 U.S.C. § 371 of International Application No. PCT/EP2020/071039, filed Jul. 24, 2020, published in English, which claims priority to European Application No. 19189885.7 filed Aug. 2, 2019, the disclosures of which are incorporated herein by reference.

FIELD OF THE DISCLOSURE

The present disclosure relates to enabling an operation of an aerosol generation device. The disclosure is particularly, but not exclusively, applicable to enabling an operation of an aerosol generation device based on an operation enablement message from a personal computing device.

BACKGROUND TO THE DISCLOSURE

The popularity and use of reduced-risk or modified-risk smoking devices, also known as electronic cigarettes, vaporisers or aerosol generation devices, has grown rapidly in the past few years. Such aerosol generation devices provide an alternative to traditional tobacco products, such as cigarettes, cigars, cigarillos, and rolling tobacco. They generally heat or warm an aerosolisable substance to generate an aerosol for inhalation, as opposed to burning tobacco as in conventional tobacco products.

Most aerosol generation devices incorporate some form of electronic control circuit, typically including a simple computer processor, allowing a user to control operation of the aerosol generation device. However, the control of the aerosol generation device is generally only performed locally, by a user directly interacting with the aerosol generation device itself, for example by the user operating buttons or other user controls on the aerosol generation device and interpreting the meaning of indicators, such as Light Emitting Diodes (LEDs), on the aerosol generation device. This limits the flexibility with which the aerosol generation device can be controlled. It also means that the manufacturer or supplier of the aerosol generation device has little interaction with the aerosol generation device once it is in the possession of the user. Software running on the device cannot easily be updated and use of the aerosol generation device cannot easily be monitored to improve the user experience.

Short-range wireless communication connections, such as Bluetooth®, are available to allow a consumer apparatus, such as an aerosol generation device, to communicate with a personal computing device. This type of connection can be exploited to allow the consumer apparatus to be controlled in a more sophisticated manner via the personal computing device.

Typically, the operating system of the personal computing device, sometimes alongside an appropriate driver, manages the short-range wireless communication connection, but does not in itself facilitate control of the consumer apparatus. Rather, dedicated applications that can run on the personal computing device are required in order to facilitate control of the consumer apparatus via the short-range wireless communication connection managed by the operating system. As many personal computing devices can only run a limited range of applications, significant difficulties can be encountered when seeking to provide a single application that runs on a range of different personal computing devices to facilitate control of the consumer apparatus, yet is able to access the short-range wireless communication connection managed by the different operating systems and/or the appropriate driver. This is due in part to the different operating requirements of different personal computing devices, such as personal computing devices with different operating systems, e.g. macOS®, Android® or Microsoft® Windows®. It is also due to restrictions put in place by manufacturers and suppliers of personal computing devices regarding the applications that they allow to be installed on their personal computing devices, for example with the Apple® App Store, Google® Play™ App Store or Windows® Store, each requiring applications to meet certain (different) criteria before being approved for inclusion in the store and hence made available to users.

The present disclosure seeks to overcome the problems outlined above.

SUMMARY OF THE DISCLOSURE

Aspects of the disclosure are set out in the accompanying claims.

According to a first aspect of the present disclosure, there is provided a method for enabling an operation of an aerosol generation device, comprising the steps: attempting to obtain a server generated operation enablement message, transmitting the server generated operation enablement message to the aerosol generation device if the server generated operation enablement message is obtained, and generating a personal computing device generated operation enablement message and transmitting the personal computing device operation enablement message to the aerosol generation device if the server generated operation enablement message is not obtained.

Optionally, the server generated operation enablement message remains valid for a first period of time and the personal computing device operation enablement message remains valid for a second period of time, the first period of time being longer than the second period of time.

Optionally, further comprising the step: storing the server generated operation enablement message if successfully obtained, preferably storing in a local storage of a web browser.

Optionally, further comprising the steps: receiving an aerosol generation device originating operation enablement request; and in response transmitting the server generated operation enablement message or the personal computing device operation enablement message to the aerosol generation device.

Optionally, further comprising the steps of: providing an unlock interface to a user; and upon the user successfully unlocking the interface, transmitting the personal computing device operation enablement message to the aerosol generation device.

Optionally, the step of attempting to obtain a server generated operation enablement message comprises attempting to retrieve the server generated operation enablement message from a storage, preferably from a/the local storage of a/the web browser.

Optionally, the step of attempting to obtain a server generated operation enablement message comprises transmitting an operation enablement request to a remote server.

Optionally, the server generated operation enablement message and/or the personal computing device operation enablement message comprise data indicative of a time to be valid for.

Optionally, further comprising the step of opening a short-range wireless communication connection to the aerosol generation device.

Optionally, the opening the short-range wireless communication connection to the aerosol generation device comprises: launching a web browser; the web browser launching a progressive web application, PWA retrieving from browser storage of the web browser, a consumer apparatus identifier corresponding to the aerosol generation device; and causing the short-range wireless communication connection to the aerosol generation device to open using the consumer apparatus identifier retrieved from the browser storage of the web browser.

Optionally, further comprising the steps: receiving, at the aerosol generation device, the server generated operation enablement message or the personal computing device operation enablement message and using it as the aerosol generation device held operation enablement message; determining whether an aerosol generation device held operation enablement message is valid or invalid, and enabling the operation if the aerosol generation device held operation enablement message is determined to be valid.

Optionally, further comprising the step: disabling the operation of the aerosol generation device. Preferably, the disabling of the operation of the aerosol generation device is performed at an end of a period of time commencing from a time at which the operation of the aerosol generation device is enabled.

Optionally, further comprising the steps: receiving an/the operation enablement request; authenticating a user of the aerosol generation device; generating the server generated operation enablement message; digitally signing the server generated operation enablement message such that the server generated operation enablement message comprises verifiable data; and transmitting the server generated operation enablement message such that the operation of the aerosol generation device is enabled when the aerosol generation device determines that the verifiable data of the server generated operation enablement message is authentic.

According to a second aspect of the present disclosure, there is provided a computer program product comprising instructions which, when executed by a computer, cause the computer to carry out the method of the first aspect.

According to a third aspect of the present disclosure, there is provided a computer apparatus arranged to execute the computer program product of the second aspect.

According to a fourth aspect of the present disclosure, there is provided a computing device comprising a processor arranged to carry out the method of the first aspect.

According to a fifth aspect of the present disclosure, there is provided a system of enabling an operation of an aerosol generation device, the system comprising: the aerosol generation device: determining whether an aerosol generation device held operation enablement message is valid or invalid, and enabling the operation if the aerosol generation device held operation enablement message is determined to be valid, the personal computing device: attempting to obtain a server generated operation enablement message, transmitting the server generated operation enablement message to the aerosol generation device if the server generated operation enablement message is obtained, and generating a personal computing device generated operation enablement message and transmitting the personal computing device operation enablement message to the aerosol generation device if the server generated operation enablement message is not obtained; and the aerosol generation device using whichever of the server generated operation enablement message or the personal computing device operation enablement message it receives from the personal computing device as the aerosol generation device held operation enablement message, wherein, when used as the aerosol generation device held operation enablement message, the server generated operation enablement message remains valid for a first period of time and the personal computing device operation enablement message remains valid for a second period of time, the first period of time being longer than the second period of time.

Optionally, the aerosol generation device transmitting an aerosol generation device originating operation enablement request to the personal computing device if the aerosol generation device held operation enablement message is invalid; and the personal computing device transmitting the server generated operation enablement message or the personal computing device operation enablement message to the aerosol generation device in response to receiving the aerosol generation device originating operation enablement request.

Optionally, the aerosol generation device disabling an operation of the aerosol generation device. Optionally, the disabling is performed when the aerosol generation device held operation enablement message is determined invalid. Optionally, the aerosol generation device held operation enablement message is determined invalid at an end of a period of the first or second period of time. Preferably, the first and second periods of times are between one day and one week.

Optionally, the aerosol generation device held operation enablement message includes data indicative of the period of time to be valid for.

Optionally, the aerosol generation device held operation enablement message includes a period of time for which the operation of the aerosol generation device is enabled.

Optionally, the operation of the aerosol generation device aerosol generation device is any one or more of the following: permitting turning on the heating element, permitting consumables that contain nicotine in the consumables module, permitting the heating element to turn on if the consumable in the consumables module contains nicotine, permitting the user interface to be turned on, turning on the user interface, and/or receiving user inputs from the user interface buttons. Preferably, the operation is permitting turning on the heating element.

Optionally, the system further comprises the step opening a short-range wireless communication connection between the aerosol generation device and a personal computing device.

Optionally, opening the short-range wireless communication connection between the aerosol generation device and the personal computing device comprises: launching a progressive web application on a web browser on the personal computing device; retrieving from a local storage of the web browser, a device identifier corresponding to the aerosol generation device; and causing the personal computing device to open the short-range wireless communication connection between the personal computing device and the aerosol generation device using the device identifier retrieved from the local storage of the web browser.

Optionally, the server generated operation enablement message is stored on the personal computing device.

Optionally, the server generated operation enablement message is stored in the local storage of the web browser on the personal computing device.

Optionally, the system comprises, at the remote server: receiving a request to generate the server generated operation enablement message; authenticating a user of the aerosol generation device; generating the server generated operation enablement message; digitally signing the server generated operational enablement message such that the server generated operational enablement message comprises verifiable data; and transmitting the server generated operation enablement message.

Optionally, the request to generate the server generated operation enablement request comprises data indicative of an age of a user of the aerosol generation device.

Optionally, the request to generate the server generated operation enablement request comprises data indicative of the user.

Optionally, the system comprises the remote server: retrieving data indicative of the age of the user from a user database using the data indicative of the user.

Optionally, authenticating the user comprises comparing the age of the user to a threshold age.

Optionally, if the user age is greater than the threshold age, the generated operational enablement message will successfully enable the operation of the aerosol generation device.

Optionally the server generated operation enablement message comprises verification information and/or verifiable data.

Optionally, the verification information comprises a public key of a public/private key pair and the verifiable data comprises a digital signature signed using the private key of the public/private key pair.

Optionally, the public/private key pair is a public/private key pair generated at a/the remote server.

Optionally, the aerosol generation device held operational enablement message further comprises an operation enablement instruction. Preferably, the operational enablement instruction comprises data indicative of the operation to be enabled.

Optionally, the operation to be enabled is any one or more of the following: permitting turning on the heating element, permitting consumables that contain nicotine in the consumables module, permitting the heating element to turn on if the consumable in the consumables module contains nicotine, permitting the user interface to be turned on, turning on the user interface, and/or receiving user inputs from the user interface buttons.

Optionally, the personal computing device operation enablement message is a child lock message.

Optionally, the system comprises the personal computing device: providing an unlock interface to the user.

Optionally, the system further comprises: the personal computing device: storing verification information and encrypting data using stored verification information.

Optionally, the verification information is generated by the personal computing device.

Optionally, the verification information is a shared secret or a public/private key pair.

Optionally, the verifiable data is specific to the user.

Optionally, the system further comprises the personal computing device: launching a progressive web application on a web browser; accessing a local storage of the web browser the local storage storing one or more consumer apparatus identifiers each corresponding to a candidate consumer apparatus; determining one of the candidate consumer apparatus as the selected communication device with which to open the short-range wireless communication connection; receive the consumer apparatus identifier (corresponding to the selected consumer apparatus) and causing the personal computing device to open the short-range wireless communication connection between the personal computing device and the selected consumer apparatus using the received consumer apparatus identifier corresponding to the selected consumer apparatus.

Optionally, the system comprises, prior to launching the progressive web application on the web browser: launching a native application on the personal computing device; and from the native application, initiating or receiving a command to launch the progressive web application.

Optionally, launching the progressive web application on the web browser on the personal computing device comprises: retrieving, from the local storage of the web browser, files for running the progressive web application.

Optionally, determining the selected consumer apparatus with which to open the short-range wireless communication connection comprises: causing the personal computing device to display a list of the candidate consumer apparatus; and receiving a user selection of one of the candidate consumer apparatus as the selected consumer apparatus.

Optionally, the system further comprises at the personal computing device: receiving, at the personal computing device, from the selected consumer apparatus an indication of the functioning of the selected consumer apparatus via the short-range wireless communication connection.

Optionally, the system further comprises on the personal computing device: storing the indication of the functioning of the selected consumer apparatus in the local storage of the web browser.

Optionally, the system further comprises on the personal computing device: transmitting the indication of the functioning of the selected consumer apparatus to a remote server via a long-range communication connection, e.g. via the Internet.

Optionally, the system further comprises, prior to transmitting the indication of the functioning of the selected consumer apparatus to the remote server: determining whether a long-range communication connection is available to the personal computing device, preferably by determining the personal computing device has internet access; and in response to determining that the long-range communication connection is available to the personal computing device, causing the long-range communication connection to be set up between the personal computing device and the remote server.

Optionally, the system further comprises sending, from the personal computing device to the selected consumer apparatus, information regarding the functioning of the selected consumer apparatus via the short-range wireless communication connection, optionally wherein the information comprises one or more settings for the consumer apparatus and/or a firmware update.

Optionally, the system comprises launching a progressive web application on a web browser on the personal computing device; receiving, in the progressive web application, a user command to scan for candidate consumer apparatus; causing the personal computing device to scan for candidate consumer apparatus using a short-range wireless communication protocol; receiving configuration information for each candidate consumer apparatus in the vicinity of the personal computing device, the configuration information comprising a consumer apparatus identifier; causing the personal computing device to display a list of the candidate consumer apparatus; receiving a user selection of one of the candidate consumer apparatus as the selected consumer apparatus; causing the personal computing device to set up the short-range wireless communication connection between the personal computing device and the selected consumer apparatus using the configuration information for the selected consumer apparatus; and storing, by the progressive web application, at least a portion of the configuration information, including the consumer apparatus identifier for the selected consumer apparatus, in the local storage of the web browser.

Optionally, the scanning for candidate consumer apparatus is initiated by a native application on the personal computing device; preferably wherein receiving the configuration information for the candidate consumer apparatus is performed by the native application on the personal computing device.

Optionally, causing the personal computing device to display the list of the candidate consumer apparatus on the personal computing device and receiving the user selection of one of the candidate consumer apparatus as the selected consumer apparatus are performed by a/the native application on the personal computing device.

Optionally, the system further comprises sending, from the native application to the progressive web application, the configuration information for the selected consumer apparatus.

Optionally, the system further comprises the personal computing device: receiving, from a remote server over a long-range communication connection, files for running the progressive web application; and storing the files for running the progressive web application in the local storage of the web browser.

Optionally, the short-range wireless communication connection is a Bluetooth connection and the consumer apparatus identifier is a MAC address.

Optionally, the personal computing device is a mobile personal computing device. Preferably, the mobile personal computing device is a smartphone or tablet.

Optionally, the candidate consumer apparatus are aerosol generation devices, such as electronic cigarettes.

According to a sixth aspect of the present disclosure, there is provided a method for enabling an operation of an aerosol generation device, the method comprising: at the aerosol generation device: determining whether an aerosol generation device held operation enablement message is valid or invalid, and enabling the operation if the aerosol generation device held operation enablement message is determined to be valid, at the personal computing device: attempting to obtain a server generated operation enablement message, transmitting the server generated operation enablement message to the aerosol generation device if the server generated operation enablement message is obtained, and generating a personal computing device generated operation enablement message and transmitting the personal computing device operation enablement message to the aerosol generation device if the server generated operation enablement message is not obtained; and the aerosol generation device using whichever of the server generated operation enablement message or the personal computing device operation enablement message it receives from the personal computing device as the aerosol generation device held operation enablement message, wherein, when used as the aerosol generation device held operation enablement message, the server generated operation enablement message remains valid for a first period of time and the personal computing device operation enablement message remains valid for a second period of time, the first period of time being longer than the second period of time.

According to a seventh aspect of the present disclosure, there is provided an aerosol generation device comprising a processor arranged to: receive an operation enablement message comprising verifiable data; verify the verifiable data using verification information stored on the aerosol generation device; and enable the operation of the aerosol generation device if the verification is successful.

According to an eighth aspect of the present disclosure, there is provided remote server for enabling an operation of an aerosol generation device, the remote server comprising a processor arranged to: receive the operation enablement request; authenticate the user; generate the operation enablement message; digitally sign the operational enablement message such that the operational enablement message comprises verifiable data; and transmit the operation enablement message such that the operation of the aerosol generation device is enabled when the aerosol generation device determines that the verifiable data of the operation enablement message is authentic.

According to a ninth aspect of the present disclosure, there is provided a method of enabling an operation of an aerosol generation device, the method comprising, at a personal computing device: receiving an operation enablement message from a remote server, the operation enablement message comprising encrypted data; storing the operation enablement message at the personal computing device; transmitting the operation enablement message to the aerosol generation device on an initial occasion for the operation of the aerosol generation device to be enabled by the aerosol generation device decrypting the encrypted data of the operation enablement message; and transmitting the operation enablement message to the aerosol generation device on one or more further occasions, subsequent to the initial occasion, for the operation of the aerosol generation device again to be enabled by the aerosol generation device decrypting the encrypted data of the operation enablement message.

Each of the aspects above may comprise any one or more features mentioned in respect of the other aspects above.

It can be appreciated that the methods can be implemented, at least in part, using computer program code. According to another aspect of the present disclosure, there is therefore provided computer software or computer program code adapted to carry out these methods described above when processed by a computer processing means. The computer software or computer program code can be carried by computer readable medium, and in particular a non-transitory computer readable medium, that is a medium on which computer code may be stored permanently, or until it is overwritten. The medium may be a physical storage medium such as a Read Only Memory (ROM) chip. Alternatively, it may be a disk, such as a Digital Video Disk (DVD-ROM), or a non-volatile memory card, e.g. a flash drive or mini/micro Secure Digital (SD) card. It could also be a signal such as an electronic signal over wires, an optical signal or a radio signal such as over a mobile telecommunication network, a terrestrial broadcast network or via a satellite or the like. The disclosure also extends to a processor running the software or code, e.g. a computer configured to carry out the methods described above.

Any apparatus feature as described herein may also be provided as a method feature, and vice versa. As used herein, means plus function features may be expressed alternatively in terms of their corresponding structure, such as a suitably programmed processor and associated memory.

According to another aspect of the disclosure, there is provided a personal computing device comprising:

storage storing the computer program product for carrying out the method;

a short-range wireless communication interface; and the computer processor operable to process the computer program product to carry out the method.

Use of the words "apparatus", "server", "device", "processor", "communication interface" and so on are intended to be general rather than specific. Whilst these features of the disclosure may be implemented using an individual component, such as a computer or a Central Processing Unit (CPU), they can equally well be implemented using other suitable components or a combination of components. For example, they could be implemented using a hard-wired circuit or circuits, e.g. an integrated circuit, and using embedded software.

The term "browser storage" means data stored in, by or in association with the web browser on the client/user device and which persists after the session ends or after the web browser stops its execution. One type of browser storage is known as "local storage". Data stored in browser storage or local storage is not automatically transmitted to the web server in every request or interaction with the server and cannot be written to directly by the server (unlike cookies). Local storage is distinguished from session storage, which is per-origin-per-window-or-tab and does not persist after the session is over, or the tab or window closed. Local storage is available, for example, in HTML5. The terms browser storage and local storage are intended to be general rather than specific, to include not just "local storage" as that term is used in HTML5 but also other equivalent forms of browser storage or local storage (e.g. other forms of web storage such as Indexed DataBase or Web SQL, etc.)

The term "aerosol" means a system of particles dispersed in the air or in a gas, such as mist, fog, or smoke. Accordingly the term "aerosolise" (or "aerosolize") means to make into an aerosol and/or to disperse as an aerosol. Note that the meaning of aerosol/aerosolise is consistent with each of volatilise, atomise and vaporise as defined above. For the avoidance of doubt, aerosol is used to consistently describe mists or droplets comprising atomised, volatilised or vaporised particles. Aerosol also includes mists or droplets comprising any combination of atomised, volatilised or vaporised particles. In preferred embodiments, the aerosol comprises a condensation aerosol which is formed by vapourising a liquid (preferably including an aerosol former liquid such as Vegetable Glycerin (VG), Propylene Glycol (PG) or a mixture thereof (PG/VG)) which then condenses to form a condensation aerosol comprising very small droplets of the vapourised liquid preferably having an indicative range of diameters between 0.5-7 microns and ideally where the maximum droplet size (for at least the vast majority of the droplets, e.g. up to about 99% of the droplets) is less than 10 microns.

As used herein, the term "aerosol generation device" or "electronic cigarette" may include a device configured to deliver a variable amount of aerosol to a user (especially a variable amount of aerosol per puff dependent upon things such as the settings of the device, the puff duration, or the puff intensity, of the user, etc.). The aerosol produced is preferably a condensation aerosol for inhalation. The device is preferably portable. Preferably the device is configured to dispense a variable amount of aerosol during a puff dependent upon the behavior of the user (e.g. a user who takes a long deep puff will cause the device to generate more aerosol during that puff than one who takes a short light puff).

It should be noted that the term "comprising" as used in this document means "consisting at least in part of". So, when interpreting statements in this document that include the term "comprising", features other than that or those prefaced by the term may also be present. Related terms such as "comprise" and "comprises" are to be interpreted in the same manner. As used herein, "(s)" following a noun means the plural and/or singular forms of the noun.

Preferred embodiments are now described, by way of example only, with reference to the accompanying drawings.

BRIEF DESCRIPTION OF THE DRAWINGS

FIG. 7 is a flow diagram illustrating a method of later initiating the short-range wireless communication connection between the personal computing device and the aerosol generation device.

FIG. 8 is a flow diagram illustrating a method of collecting and transmitting information about the aerosol generation device to the remote server.

FIG. 9 is a flow diagram illustrating a method of enabling an operation of the aerosol generation device.

FIG. 10 is a flow diagram illustrating a method of disabling an operation of the aerosol generation device.

DETAILED DESCRIPTION OF PREFERRED EMBODIMENTS

Figure 1:
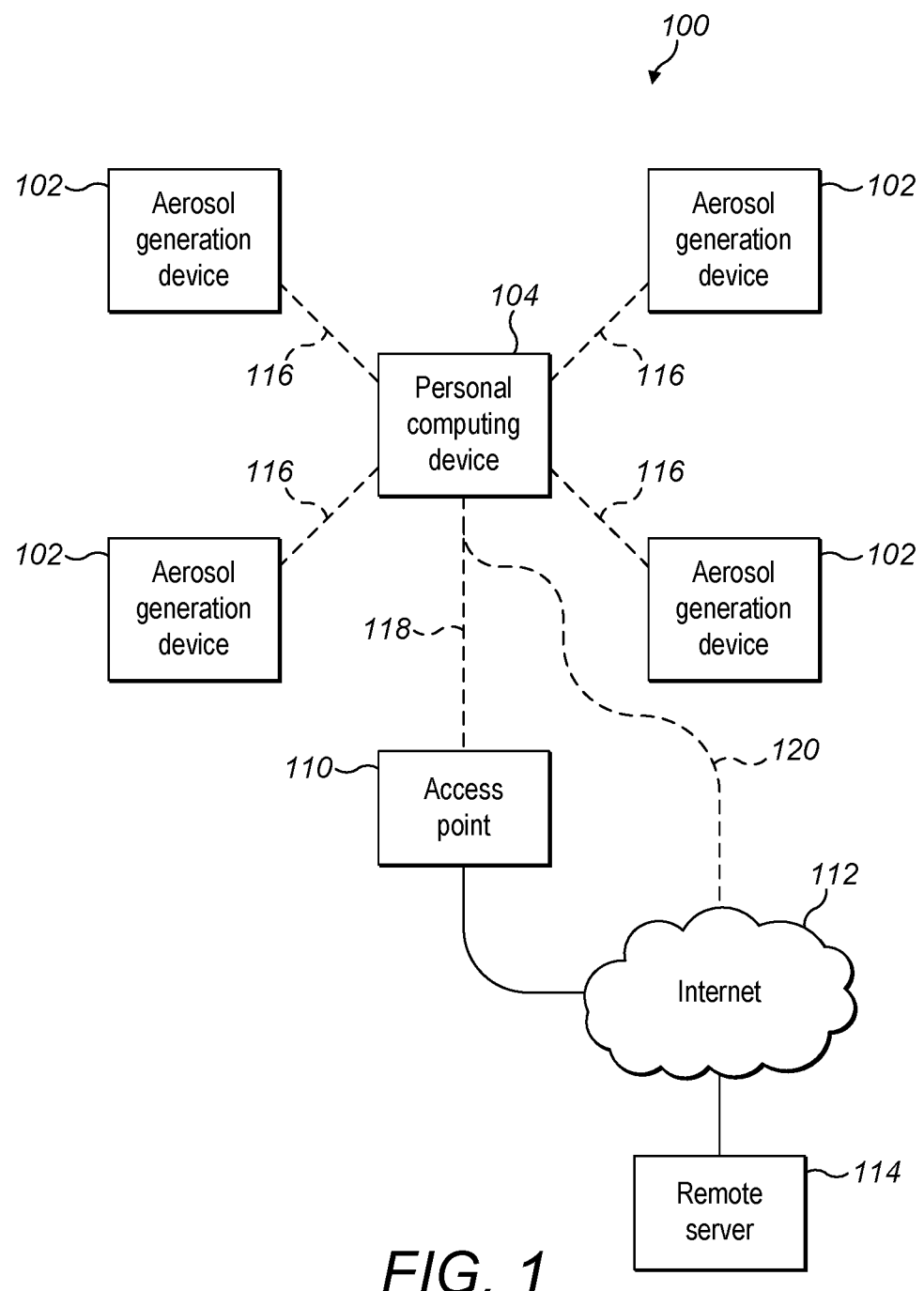
FIG. 1 is a schematic diagram of a communication network according to a preferred embodiment of the disclosure.

Referring to FIG. 1, according to a first embodiment, in a communication network 100 a personal computing device 104 is in communication with one or more aerosol generation devices 102 (each of which is a consumer apparatus). In the illustrated embodiment, the personal computing device 104 is potentially in communication with four aerosol generation devices 102. A communication link between the personal computing device 104 and each aerosol generation device 102 is a short-range wireless communication connection 116. In the present embodiment, this short-range wireless communication connection 116 is a Bluetooth® connection. In other embodiments, the short-range wireless communication connection 116 is a connection implemented using one or more of the Institute of Electrical and Electronics Engineers (IEEE) 802.11 standards (Wi-Fi®), an Infrared (IR) wireless connection, a ZigBee® connection or some other similar connection. In one particular embodiment, the short-range wireless communication connection is a Near-field Communication (NFC) connection. NFC employs electromagnetic induction between two loop antennas. NFC-enabled devices, e.g. the personal computing device 104 and the aerosol generation device 102, exchange information using a globally available unlicensed radio frequency band, e.g. the industrial, scientific and medical (ISM) band of 13.56 MHz. NFC communication is defined by the International Organization for Standardization (ISO) and the International Electrotechnical Commission (IEC) Joint Technical Committee (JTC). The ISO/IEC 18000-3 standard achieves rates ranging from 106 to 424 kbit/s. The reference to "short-range" in the context of the short range wireless communication connections 116 therefore means capable of being maintained over a few metres, for example up to around 100 metres but usually less than 10 metres and, indeed, in the context of NFC for example, less than 10 cm or even just up to 4 cm.

The personal computing device 104 is also in communication with a remote server 114 via the Internet 112. In the present embodiment, the personal computing device 104 is arranged to communicate with the Internet 112 via an access point 110. The personal computing device 104 is arranged to communicate with the access point 110 via another short-range wireless communication connection 118. This other short-range wireless communication connection 118 is a Wi-Fi® connection in the present embodiment. In other embodiments, the other short-range wireless communication connection 118 is a Bluetooth® connection, IR wireless connection, ZigBee® connection or some similar connection. In the present embodiment, the personal computing device 104 is also arranged to communicate with the Internet 112 via a cellular radio network link 120 using an appropriate communication standard, such as Global System for Mobile Communications (GSM), Universal Mobile Telecommunications System (UMTS) or Long-Term Evolution (LTE), to provide data communication. The personal computing device 104 typically selects to communicate with the Internet 112 from time to time via the other short-range wireless communication connection 118 and the access point 110 or via the cellular radio network link 120, depending upon availability and other criteria and preferences.

In the present embodiment, the personal computing device 104 is a mobile computing device, in particular a smartphone running the Android® operating system. In other embodiments, the personal computing device 104 is a smartphone, tablet computing device or laptop computer running any other type of operating system such as iOS, Linux or Windows for mobile OS. In most embodiments, the personal computing device 104 is arranged to communicate via the cellular radio network link 120 and as such the personal computing device 104 can be referred to as User Equipment (UE). In other embodiments, the personal computing device 104 is a desktop Personal Computer (PC) configured to communicate via the Internet 112 via a wired Ethernet connection. In such an embodiment, the Ethernet connection is effectively similar to the other short-range wireless connection 118, in that it connects, albeit via a fixed line or wired connection rather than a wireless one, to the access point 110, e.g. in the form of a broadband modem or the like, and thence on to the Internet 112.

Figure 2:
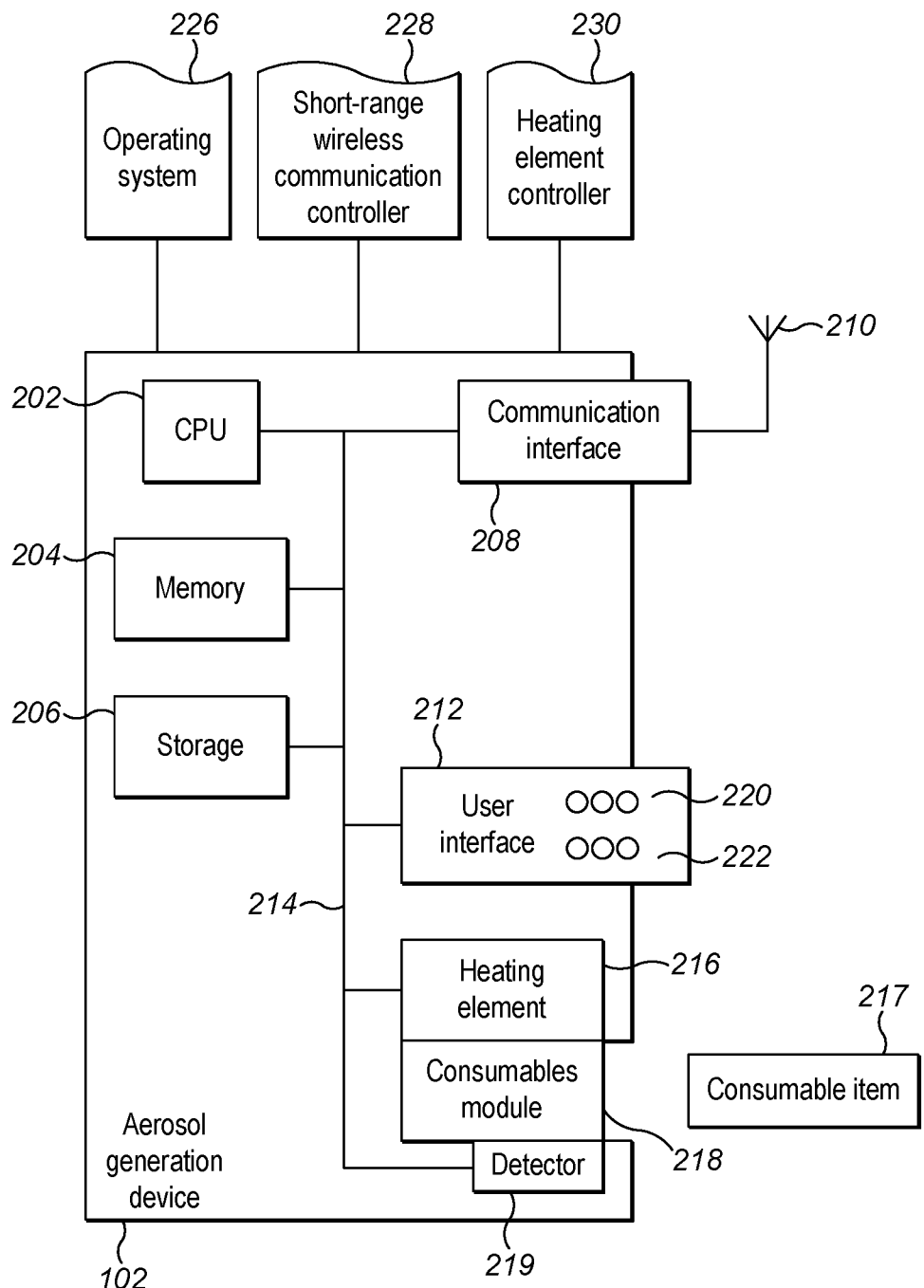
FIG. 2 is a schematic diagram of an aerosol generation device operating in the communication network.

Referring to FIG. 2, in common with a general electronic consumer apparatus, each aerosol generation device 102 comprises a Central Processing Unit (CPU) 202, memory 204, storage 206, communication interface 208, antenna 210 and a user interface 212 in communication with one another via a communication bus 214.

The aerosol generation device 102 also has aerosol generation components, in particular a heating element 216 and a consumables module 218 which includes, in the present embodiment, a detector 219 for detecting when a suitable consumable item 217 has been inserted into the consumables module 218. Note that in the present embodiment, the consumable item 217 is in the form of a tobacco rod or stick as described in greater detail below and includes a mouthpiece, e.g. a filter such as an acetate or through hole filter as commonly used in cigarettes. It should be noted, however, that several of the methods described below are applicable to other types of consumer apparatus, which typically have the computer related components but not the aerosol generation components of the aerosol generation device 102. It should therefore be understood that, in the context of those methods, the described aerosol generation device 102 is just one example of an appropriate consumer apparatus for use with the methods.

The CPU 202 is a computer processor, e.g. a microprocessor. It is arranged to execute instructions, e.g. in the form of computer executable code, and to process data, e.g. in the form of values and strings, including instructions and data stored in the memory 204 and the storage 206. The instructions and data executed by the CPU 202 include instructions for coordinating operation of the other components of the aerosol generation device 102, such as instructions and data for controlling the communication interface 208 and the user interface 214.

The memory 204 is implemented as one or more memory units providing Random Access Memory (RAM) for the aerosol generation device 102. In the illustrated embodiment, the memory 204 is a volatile memory, for example in the form of an on-chip RAM integrated with the CPU 202 using System-on-Chip (SoC) architecture. However, in other embodiments, the memory 204 is separate from the CPU 202. The memory 204 is arranged to store the instructions and data executed and processed by the CPU 202. Typically, only selected elements of the instructions and data are stored by the memory 204 at any one time, which selected elements define the instructions and data essential to the operations of the aerosol generation device 102 being carried out at the particular time. In other words, the instructions and data are stored transiently in the memory 204 whilst some particular process is handled by the CPU 202.

The storage 206 is provided integrally with the aerosol generation device 102, in the form of a non-volatile memory. The storage 206 is in most embodiments embedded on the same chip as the CPU 202 and the memory 204, using SoC architecture, e.g. by being implemented as a Multiple-Time Programmable (MTP) array. However, in other embodiments, the storage 206 is an embedded or external flash memory, or such like. The storage 206 stores the instructions and data executed and processed by the CPU 202. The storage 206 stores the instructions and data permanently or semi-permanently, e.g. until overwritten. That is, the instructions and data are stored in the storage 206 non-transiently. Typically, the instructions and data stored by the storage 206 relates to instructions fundamental to the operation of the CPU 202, communication interface 208, user interface 212 and the aerosol generation device 102 more generally, as well as to applications performing higher-level functionality of the aerosol generation device 102.

The communication interface 208 supports short-range wireless communication, in particular Bluetooth® communication. The communication interface 208 is configured to establish the short-range wireless communication connection 116 with the personal computing device 104. The communication interface 208 is coupled to the antenna 210, via which antenna 210 wireless communications are transmitted and received over the short range wireless communication connection 116. It is also arranged to communicate with the CPU 202 via the communication bus 214.

The user interface 212 comprises a display 220 and input device 222. In this embodiment, the display 220 is a plurality of separate indicators, such as Light Emitting Diodes (LEDs). In other embodiments, the display 220 is a screen, such as a Thin-Film-Transistor (TFT) Liquid Crystal Display (LCD) display or an Organic Light Emitting Diode (OLED) display, or other appropriate display. The input device 222 is one or more user operable buttons, responsive to depression, toggling or touch by the user. The user interface 212, is arranged to provide indications to the user, under the control of the CPU 202, and to receive inputs from the user, and to convey these inputs to the CPU 202 via the communications bus 214.

The aerosol generation device 102 may be described as a personal inhaler device, an electronic cigarette (or e-cigarette), a vaporiser or vaping device. In one particular embodiment, the aerosol generation device 102 is a Heat-not-Burn (HnB) device. All of these devices generally heat or warm an aerosolisable substance to generate an aerosol for inhalation, as opposed to burning tobacco as in conventional tobacco products.

In more detail, the aerosol generation device 102 is configured to heat a consumable item 217 inserted into the consumables module 218, using the associated heating element 216 to produce an inhalable aerosol or vapour for a user to inhale. The consumables module 218, in the present embodiment, is intended to receive a consumable item 217 in the form of a rod which contains processed tobacco material (e.g. a crimped sheet or oriented strips of Reconstituted ToBacco (RTB) paper impregnated with a liquid aerosol former). The liquid aerosol former in the present embodiment comprises Vegetable Glycerin (VG) but may be a mixture of Propylene Glycol (PG) and VG or other humectants, e.g. vegetol (13 propanediol), the use of which in the present embodiment may be advantageous as it performs well in nicotine containing aerosol formulations over a range of different temperatures of the heating element; since the present embodiment provides the possibility for the user to adjust operating temperatures in a convenient manner the use of such humectants which perform well over a range of operating temperatures is beneficial. It should be noted that this advantage applies to all sorts of embodiments (e.g. liquid vaporising e-cigarettes as well as heat not burn type devices) and thus the advantageous use of vegetol is not limited to any particular type of aerosol generating device. In the present embodiment, the consumable item 217 uses pure VG, which does not contain any flavourings or nicotine. Instead, volatile flavourings and nicotine derived from the RTB are vapourised at the same time as the aerosol former and is entrained into the resulting condensation aerosol for inhalation by the user. However, in other embodiments, the consumable item 217 has aerosol former containing nicotine and other flavourings. In such cases the consumable item 217 typically contains other solid porous matter to absorb the aerosol former liquid, for example a mousse formed with a gelling agent and a suitable binder which may or may not contain tobacco.

The consumables module 218 has a detector 219 for detecting the consumable item 217 inserted into the consumables module 218. The detector 219 is operable to identify a type of the consumable item 217 inserted into the consumables module 218 and to determine if the inserted consumable item 217 is appropriate for use in the aerosol generation device 102. In the present embodiment, the consumables module 218 achieves this by detecting an indicium (e.g. a printed bar code or an RFID chip or an NFC tag etc.) on the consumable item 217.

In an alternative embodiment, the consumable item 217 is a capsule containing aerosol former stored in a reservoir and having a vaporisation chamber whereby liquid from the reservoir is heated by the heating element 216 (e.g. via a wick or via a heat transfer element or via a dosing element which transports a small dosage of liquid aerosol former to a heated vaporisation surface which is heated by the heating element 216, etc.). Preferably the aerosol former comprises VG or a PG/VG mixture together with nicotine and/or flavourings.

In another alternative embodiment, the aerosol generation device 102 does not include the heating element 216, but instead provides power to the consumable item 217, which itself contains a heating element (e.g. the consumable item is a "cartomiser"). In such case the cartomiser includes a liquid reservoir for storing the aerosol former, which is again preferably formed of VG or a PG/VG mixture together with nicotine and/or flavourings.

It is also possible that the aerosol generation device 102 further includes a capsule downstream of the cartomiser or vaporisation chamber, which capsule contains processed tobacco granules which impart flavour and/or nicotine to the condensation aerosol as it passes through the capsule before exiting the aerosol generation device 102 for inhalation by a user.

The aerosol generation device 102 is configured to run a plurality of software modules. The software modules include an operating system 226, a short-range wireless communication controller 228 and a heating element controller 230. Each of the software modules comprises a set of instructions for performing one or more functions of the aerosol generation device 102. The instructions are provided in the form of computer executable code stored in the storage 206 and/or the memory 204, and processed by the CPU 202, communication interface 208 and user interface 212.

In the present embodiment, the operating system 226 is an embedded or a real time operating system. Such operating systems are optimised to reduce delays and to allow for a better user experience. The operating system 226 manages the basic functioning of the hardware of the aerosol generation device 102 and operational interactions between the hardware components of the aerosol generation device 102 and software modules.

The short-range wireless communication controller 228 is primarily configured to control the communication interface 208. It is operable to establish the short-range wireless connection via the communication interface 208. In the present embodiment, the short-range wireless communication connection is a Bluetooth® connection. Consequently, the short-range wireless communication controller 228 includes instructions in accordance with the Bluetooth® wireless communication standards, as available at www.bluetooth.org, with Bluetooth 5.0 being the currently prevailing specification.

The heating element controller 230 is configured to control the heating element 216. It is operable to monitor the amount of energy and the power (i.e. rate of energy) supplied to the heating element 216 and the temperature of the heating element 216 (preferably by monitoring the resistance of the heating element 216, which is known to vary in a predetermined way with the temperature of the heating element 216). In particular though, in the present embodiment, the heating element controller 230 is configured to receive commands to disable or enable the use of the heating element 216. (Note that in embodiments where the aerosol generation device 102 does not itself include a heating element 216 but instead supplies power to a heating element within a consumable item 217 (e.g. a cartomiser) then the heating element controller 230 instead controls the supply of power to the heating element contained within the consumable item 217).

Figure 3:
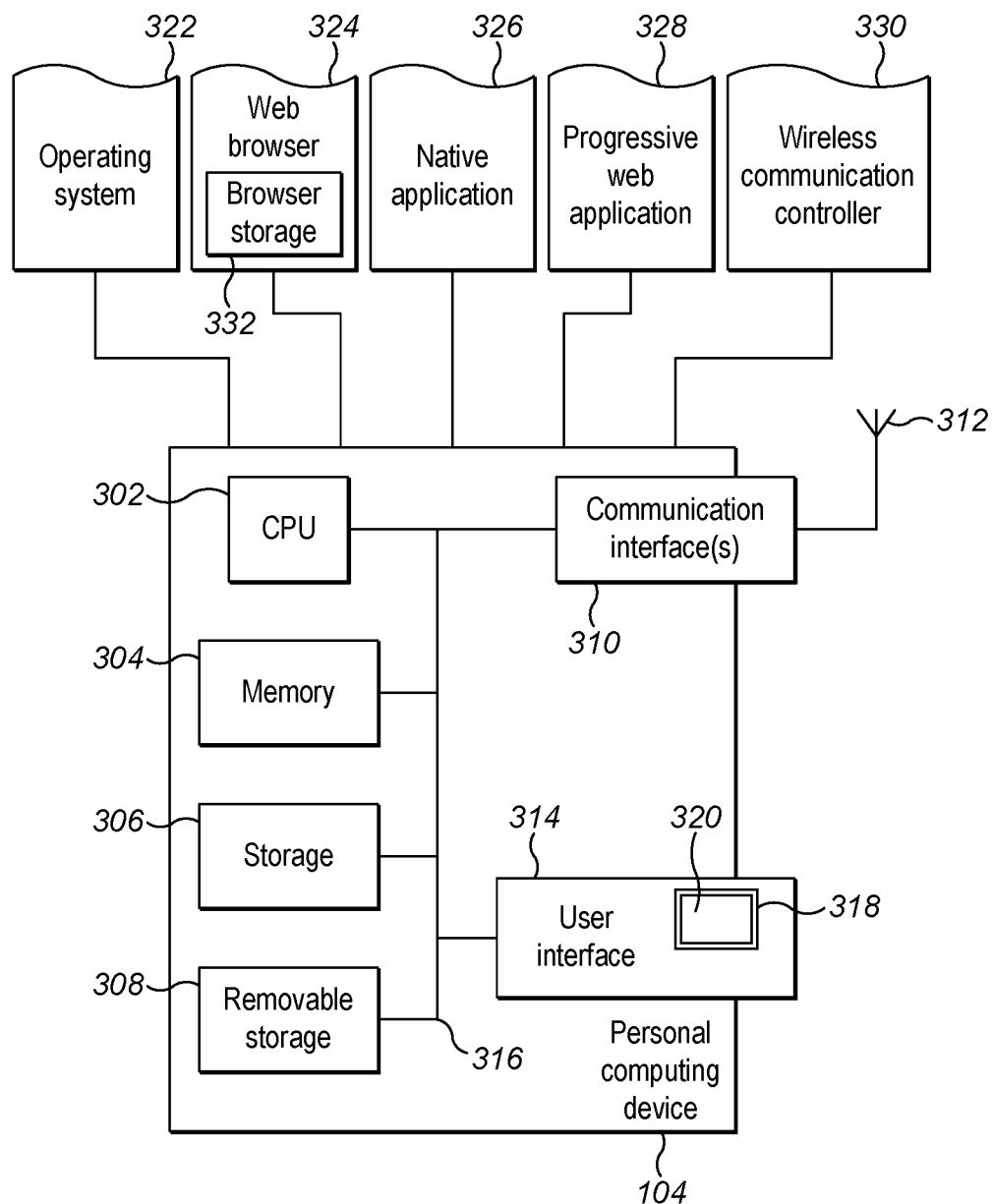
FIG. 3 is a schematic diagram of a personal computing device operating in the communication network.

Referring to FIG. 3, the personal computing device 104 comprises a CPU 302, memory 304, storage 306, removable storage 308, communication interface 310, antenna 312 and user interface 314 in communication with one another via a communication bus 316.

The CPU 302 is a computer processor, e.g. a microprocessor. It is arranged to execute instructions, e.g. in the form of computer executable code, and to process data, e.g. in the form of values or strings, including instructions and data stored in the memory 304, storage 306 and removable storage 308. The instructions and data executed and processed by the CPU 302 include instructions and data for coordinating operation of the other components of the personal computing device 104, such as the communication interface 310 and the user interface 314. They also include instructions and data for running applications on the personal computing device 104.

The memory 304 is implemented as one or more memory units providing RAM for the personal computing device 104. In the illustrated embodiment, the memory 304 is a Dynamic RAM (DRAM) memory chip integrated on a motherboard of the personal computing device 104 alongside the CPU 302. However, in other embodiments, the memory 304 is provided differently, for example in an integrated package with the CPU 302 or as plug-in memory unit. The memory 304 is arranged to store the instructions and data executed and processed by the CPU 302. Typically, only selected elements of the instructions and data are stored by the memory 304 at any one time, the selected elements defining the instructions and data relating to the operations of the personal computing device 104 being carried out at the particular time. In other words, the instructions and data are stored transiently in the memory 304 whilst some particular process is handled by the CPU 302.

The storage 306 is provided integrally with the personal computing device 104, in the form of a non-volatile memory. The storage 306 comprises a memory unit, usually including a Read Only Memory (ROM), flash memory and or a cache memory, integrated on the motherboard of the personal computing device 104. Removable storage 308 is also provided in the illustrated embodiment, although this is optional. The removable storage 308 is again a non-volatile memory, typically in the form of a micro Secure Digital (SD) card or some other portable flash memory device. The storage 306 and removable storage 308 are arranged to store the instructions and data used by the personal computing device 104. The storage 306 and removable storage 308 stores the instructions and data permanently or semi-permanently, e.g. until overwritten. Typically, the elements of the computer instructions and data stored by the storage 306 and removable storage 308 comprise instructions and data essential to basic operation of the personal computing device 104, as well as instructions and data relating to applications installed or installable on the personal computing device 104, including those that perform the methods described below.

The communication interface 310 comprises a short-range wireless communications interface and a cellular radio communications interface, and is coupled to the antenna 312. The short-range wireless interface is configured to establish the short-range wireless communication 116, for example the Bluetooth® connection, with the aerosol generation device 102, and to establish the other short-range wireless communication connection 118, for example the Wi-Fi® connection, with the access point 110. The cellular radio communications interface is configured to establish the cellular radio communication connection 120 to the Internet 112 using appropriate protocols previously discussed. As such, the communications interface 310 comprises one or more wireless modems suitable for supporting the different communication connections 116, 118, 120 (see FIG. 1). In another embodiment, the communication interface 310 also comprises a wired communication interface. The wired communication interface may be used to provide a wired communication connection, for example an Ethernet or Universal Serial Bus (USB) connection (not shown), to the access point 110.

The user interface 314 comprises a display 318 and an input device 320. In the present embodiment, the display 318 and the input device 320 are implemented together as a touch sensitive screen. The display 318 is a Thin-Film-Transistor (TFT) Liquid Crystal Display (LCD) display or an Organic Light Emitting Diode (OLED) display, or other appropriate display. The input device 320 is a capacitive layer provided over the display 318, arranged to detect touch by the user. The user interface 314 is arranged to display information to the user under the control of the CPU 302 and to convey input from the user, derived from the user touching the input device 320, to the CPU 302 via the communication bus 316.

The personal computing device 104 is configured to run a plurality of software modules. The software modules include an operating system 328, a web browser 324, a native application 326, Progressive Web Application (PWA) 328 and a wireless communication controller 330. Each of the software modules comprises a set of instructions for performing one or more functions of the personal computing device 104. The instructions are provided in the form of computer executable code stored in the storage 306, removable storage 308 and/or the memory 304, and processed by the CPU 302, communication interface 310 and user interface 314.

In the present embodiment, the personal computing device 104 is a smartphone whose operating system 322 is an Android® operating system. However, several other operating systems are suitable as alternatives, such as Apple® iPhone® OS (iOS) and Microsoft® Windows® 10. The operating system 322 manages the basic functioning of the hardware of the personal computing device 104 and operational interactions between the hardware components of the personal computing device 104 and software modules.

The web browser 324 is configured to download and process web resources from the Internet 112, and to render them on the display 318 where appropriate. The web browser 324 is also configured to cache downloaded web resources in the memory 304 and storage 306 of the personal computing device 104. Typically, the web browser 324 downloads HyperText Markup Language (HTML), JavaScript, Cascading Style Sheet (CSS), and image files. These web resources are processed to display information, such as web pages, on the display 318 of the user interface 314. In the present embodiment, the web browser 324 is Google® Chrome®, but this is not essential and in other embodiments the web browser is, e.g., Safari®, Firefox® or Microsoft® Edge®. Alternatively, the web browser 324 may be a web browser designed specifically for handling PWAs, offline web pages, or other web based technologies, such as Electron™ developed by GitHub®.

The web browser 324 has browser storage 332. Physically, the browser storage 332 is effectively a part of the memory 304 or storage 306. However, more importantly, the operating system 322 and web browser 324 are configured to provide the browser storage 332 as a portion of memory having certain operating characteristics. Specifically, browser storage 332 is storage in which stored data persists after a session of the web browser 334 ends or after the web browser 334 stops its execution. In some embodiments, browser storage 332 is implemented as web storage, as the term is understood under, say, the Hypertext Markup Language 5 (HTML5) standard. More specifically, the browser storage 332 is local storage. Local storage data (unlike cookies) is not automatically transmitted to a web server in every request or interaction with the web server and cannot be written to directly by the web server. Local storage is distinguished from session storage, which is per-origin-per-window-or-tab and does not persist after the session is over, or the tab or window closed. Local storage is available, for example, in HTML5. The browser storage 332 is, in this embodiment, stored within files of the web browser 334 (e.g. files storing user preferences and other configurations, etc.).

The native application 326 is configured to manage running of the web browser 324 and the PWA 328. In particular, the native application 326 is arranged to modify the functionality of the web browser 324 so that it can handle calls made by the PWA 328 for communication to the aerosol generation device 102 via the short-range wireless communication connection 116. In the present embodiment, this is achieved by the native application 326 providing a resource, e.g. code such as Javascript and/or Swift code. The resource specifies how calls generated within the web browser 324 by the PWA 328, e.g. using a Web Bluetooth® Application Programming Interface (API), should result in corresponding commands processed by the native application 326, e.g. using a Bluetooth® API. The commands are configured to cause the wireless communication controller 320 to perform certain operations, e.g. setting up the short-range wireless communication connection 116 (e.g. a Bluetooth® connection) or transmitting or receiving messages over the short-range wireless communication connection 116. In this way, the native application 326 provides seamless communication between the PWA 328 and the wireless communication controller 330.

It will be appreciated that the native application 326 generally has access to hardware and peripherals of the personal computing device 104 via the operating system 322. The hardware and peripherals include the communication interface 310, storage 306, removable storage 308 and user interface 314, as well as cameras, microphones etc. (not shown). The native application 326 can therefore provide communication between the PWA 328 and other hardware and peripherals of the personal computing device 104, not just the communication interface 310.

The native application 326 is typically programmable using a Software Development Kit (SDK). By using the appropriate SDK, it is possible to configure the native application 326 to have the functionality described above. In particular, it possible to configure the native application 326 to interface with the operating system 322 and the appropriate software drivers so as to control the hardware and peripherals of the personal computing device 104 as required, and to provide the resource to the web browser 324.

The web browser 324 is configured to download, store, and run the PWA 328. The PWA 328 typically comprises HyperText Markup Language (HTML), JavaScript, Cascading Style Sheet (CSS), JavaScript Object Notation (JSON), eXtensible Markup Language (XML), image files or any other files of the PWA 328. The files of the PWA 328, e.g. in the form of instructions and data, are initially downloaded from the web server 422 of the remote server 114 and thereafter stored in the browser storage 332. In an alternative embodiment, the files of the PWA 328 are stored elsewhere in storage 306, memory 304, and/or a cache of the CPU 302.

In general, PWAs provide a way for users to benefit from similar functionality to that provided by native applications. However, PWAs are limited in that they cannot necessarily access certain functions, data structures and interfaces of the personal computing devices on which they may run. For example, ways of accessing some functions, data structures and interfaces of the personal computing device 104 are defined in the SDK for the native application 326, and are not accessible via the web browser 324 on which the PWA 328 runs. In some instances, indirect access to certain hardware and peripherals is still possible for PWAs through Web APIs. However, there are many exceptions to this, and the utility of Web APIs varies from device to device. In particular, even though the PWA 328 is configured to receive messages or data received at the personal computing device 104 via the Web Bluetooth® API and similarly to transmit messages or data to the aerosol generation device 102 connected to the personal computing device 104 via the Bluetooth® Web API, this will not be effective unless the personal computing device 104 is configured to function with the Web Bluetooth® API. This configuration is provided by the native application 326.

The wireless communication controller 330 is primarily configured to control the communication interface 310. It is operable to establish the short-range wireless connection 116 via the communication interface 310. In the present embodiment, the short-range wireless communication connection 116 is a Bluetooth® connection. Consequently, the wireless communication controller 330 includes instructions in accordance with the Bluetooth® wireless communication standards, as available at www.bluetooth.org, with Bluetooth 5.0 being the currently prevailing specification.

The wireless communication controller 330 includes any necessary hardware drivers for controlling the Bluetooth® module (which is part of the communication interface 310) as well as the Android® Bluetooth® API by which the native application 326 can access and control the Bluetooth® module of the communication interface 310 (e.g. in response to a call to the Web Bluetooth® API by the PWA 328).

Figure 4:
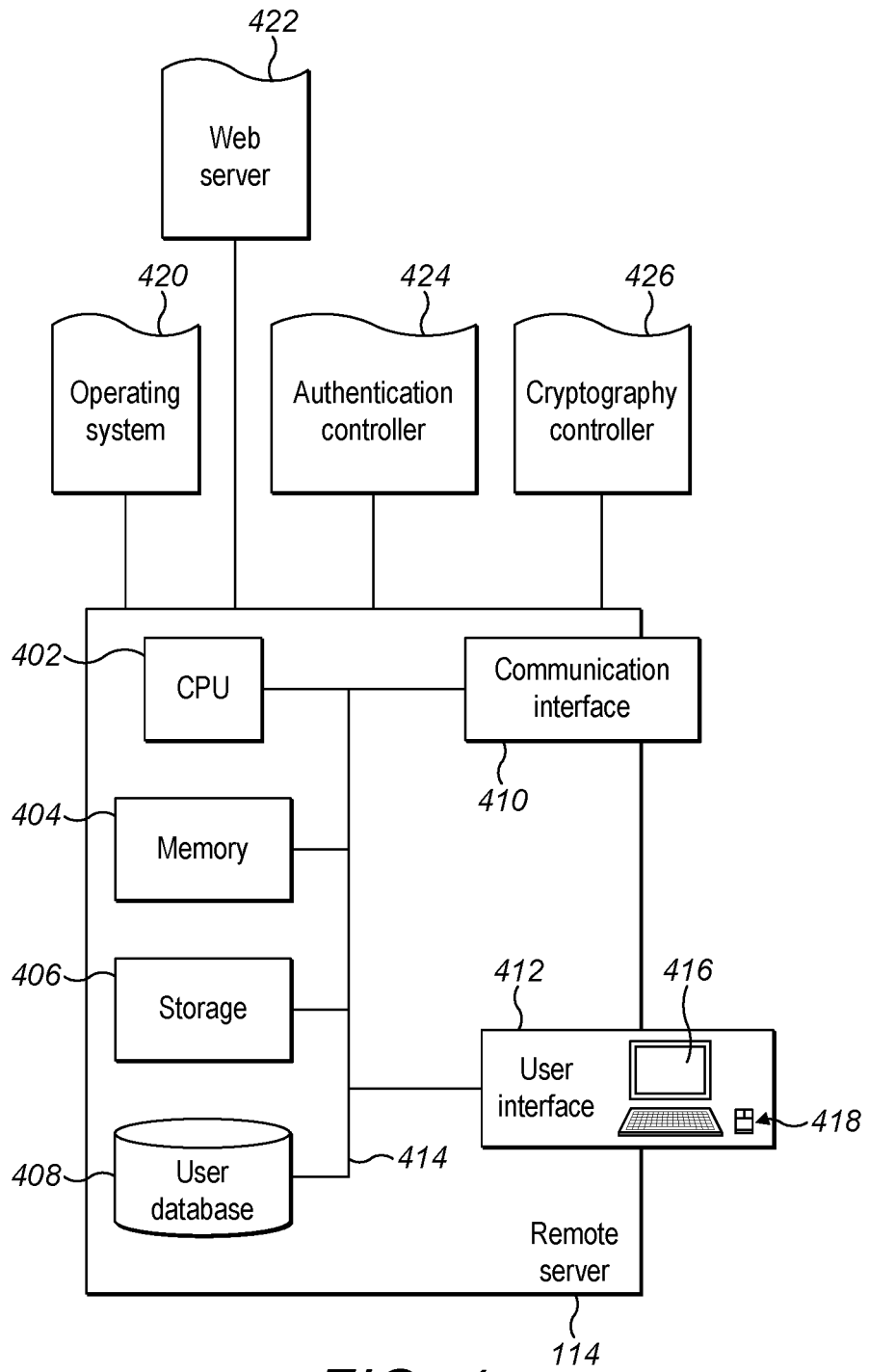
FIG. 4 is a schematic diagram of a remote server operating in the communication network.

Referring to FIG. 4, the remote server 114 comprises a CPU 402, memory 404, storage 406, a user database 408, communication interface(s) 410 and user interface 412 in communication with one another via a communications bus 414.

The CPU 402 is a computer processor, e.g. a microprocessor. It is arranged to execute instructions, e.g. in the form of computer executable code, and to process data, e.g. in the form of values and strings, including instructions and data stored in the memory 404 and storage 406. The instructions and data executed and processed by the CPU 402 include instructions and data for coordinating operation of the other components of the remote server 114, such as the user database 108, communication interface 410 and user interface 412. They also include instructions and data for running applications on the remote server 114.

The memory 404 is implemented as one or more memory units providing RAM for the remote server 114. In the illustrated embodiment, the memory 404 is a DRAM memory unit mounted to a motherboard of the remote server 114 alongside the CPU 402. However, in other embodiments, the memory 404 is provided differently, for example as a memory chip integrated with the motherboard or the CPU 402. The memory 404 is arranged to store the instructions and data executed and processed by the CPU 402. Typically, only selected elements of the instructions and data are stored by the memory 404 at any one time, the selected elements defining the instructions and data relating to the operations of the remote server 114 being carried out at the particular time. In other words, the instructions and data are stored transiently in the memory 404 whilst some particular process is handled by the CPU 402.

The storage 406 comprises a hard disk drive or flash drive mounted in the remote server 114 or as a separate storage unit accessible to the remote server 114. The User database 408 may be implemented with the storage. That is, the user database 408 is typically a part of the storage 406, e.g. data stored by the storage. However, in other embodiments, the user database 408 is separate from the storage, e.g. comprising a separate hard disk drive or storage unit. The storage 406 is arranged to store the instructions and data used by the remote server 114. The storage 406 stores the instructions and data permanently or semi-permanently, e.g. until overwritten. Typically, the elements of the instructions and data stored by the storage 406 comprises instructions and data essential to basic operation of the remote server 114, as well as instructions and data relating to applications installed or installable on the remote server, including those that perform the methods described below. The user database 408 is configured to store information relating to users that own, or have owned, one or more of the aerosol generation device(s) 102, along with configuration information relating to the users and the aerosol generation devices 102.

The communications interface 410 comprises a wired communication interface that is configured to connect to the Internet 112. The wired communication interface typically connects to the Internet 112 via an access point (not shown) and an Internet Service Provider (ISP), for example via an Ethernet or Universal Serial Bus (USB) connection (not shown), and a suitable modem.

The user interface 412 comprises a display 416 and an input device 418. In the present embodiment, the display 416 is a computer monitor and the input device 418 is a keyboard and mouse.

The remote server 114 is configured to run a plurality of software modules. The software modules include an operating system 420 and a web server 422. Each of the software modules comprises a set of instructions and data for performing one or more functions of the remote server 114. The instructions, e.g. provided in the form of computer executable code, and the data, e.g. in the form of values or strings, are stored in the memory 404 and storage 406, and executed or processed by the CPU 402.

In the present embodiment, the operating system 420 is a server optimised operating system, such as those provided by Linux® and Microsoft® Windows®. The operating system 420 manages the basic functioning of the hardware of the remote server 114 and operational interactions between the hardware components of the remote server 114 and the software modules. In some embodiments, the web server 422 is implemented as part of the operating system 420, e.g. as a function or module of the operating system 420. In other embodiments, the web server 422 is an application running on the remote server 114, or even at a remote site under the control of the remote server 114. The web server 422 is arranged to provide the files for running the PWA 328 to the personal computing device 104, on request. It also provided a portal to manage interactions between the personal computing device 104 (and aerosol generation devices 102) and the user database 408.

Figure 5:
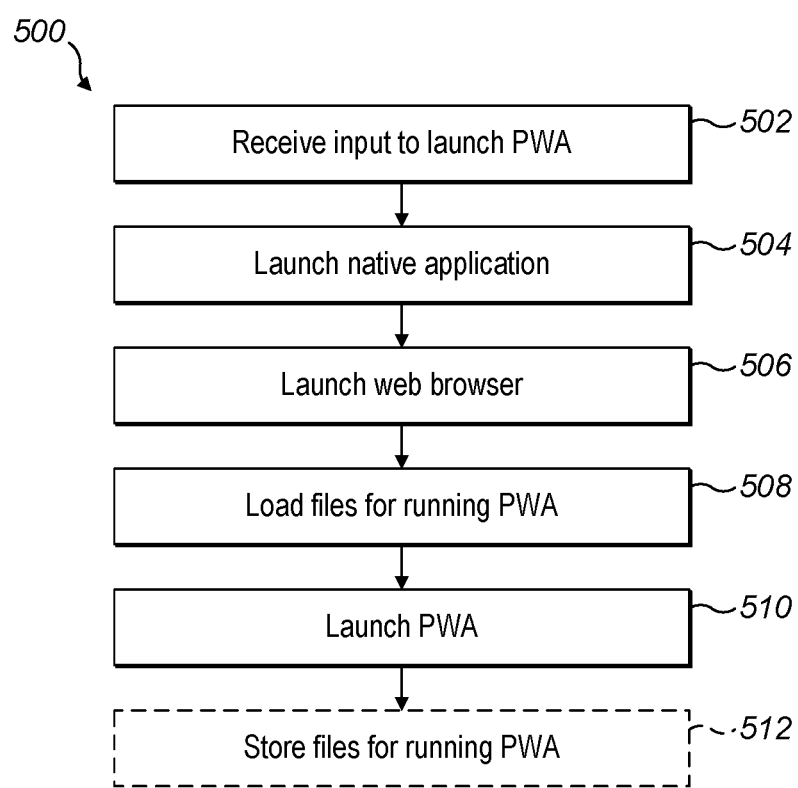
FIG. 5 is a flow diagram illustrating a method of preparing and launching a Progressive Web Application (PWA) on the personal computing device.

Referring to FIG. 5, a method 500 of launching the PWA 328 involves a user first interacting with the user interface 314 of the personal computing device 104 to provide an input indicating that the user wishes to open the PWA 328. In one embodiment, when the user first purchases an aerosol generation device 102, the user is prompted to download and install the PWA 328. In this embodiment, the user accesses a URL that is present on the packaging or user interface 212 of the aerosol generation device 102 using the web browser 324 of the personal computing device 104. The URL points to a website hosted on the web server 422 of the remote server 114. In one embodiment, the accessing of the URL is achieved by the user operating the personal computing device 104 to scan a barcode that encodes the URL. Specifically, the barcode may be a 2D barcode. Alternatively or in addition, the URL is presented in plain text for the user to type into the web browser 324 of the personal computing device 104.

In more detail, the user is typically prompted by the packaging of the newly purchased aerosol generation device 102 to visit a specified website associated with the personal computing device 104. At the website the user is given instructions as to how to download the native application 326 from a suitable repository for whichever type of operating system the user's personal computing device 104 is employing (e.g. Android®). Once the user follows these instructions and downloads and installs the native application 326 the user is asked to launch the native application 326 and from within the native application 326, or more specifically from within the web browser 324 launched under the control of the native application, to navigate to a specified website from whence the PWA 328 is downloaded. From within the native application 326, the downloading of the PWA 328 may commence automatically once the URL is selected, or following a further input from the user, e.g. by the user double clicking on an associated icon on the user interface 314 of the personal computing device 104. When the PWA 328 has not previously been accessed from the particular personal computing device 104 and/or is not installed on the personal computing device 104, the icon may be displayed in the web browser 324. That is, the user first navigates to a web page provided to the personal computing device 104 by the web server 422, which web page includes the icon. Once the files for running the PWA 328 have been downloaded from the web server 422, the PWA may be launched.

During subsequent launches of the PWA 328, the icon is typically displayed on a home screen element of the personal computing device 104. When this icon is selected by the user, the personal computing device 104 receives, at step 502, an input indicating that the user wishes to launch the PWA 328. In response to the input from the user, rather than launching the PWA 328 directly, the personal computing device 104 launches the native application 326 on the personal computing device 104, at step 504. The native application 326 in turn launches (or re-launches) the web browser 324, at step 506. The native application 326 then loads files for launching the PWA 328, at step 508, and launches the PWA 328 on the web browser 324, at step 510.

It will be understood that the native application 326 allows a user to initiate the launching of the PWA 328 via the user interface 314 using the method. However, in some embodiments, the native application 326 automatically (i.e. without explicit interaction from the user) causes the PWA 328 to be launched, particularly for second and subsequent launchings of the PWA 328, where the files for running the PWA 328 are already downloaded and stored (cached) in the browser storage 324 of the web browser 324. In such a case, it is preferred that the user has some way of preventing the automatic launching of the PWA 328 if they should choose to do so, e.g. by clearing from the browser storage 324 the stored files necessary for running the PWA 328 or by modifying a setting associated with the native application 326 or by some other suitable mechanism.

In order to launch the PWA 328, the native application 326 first launches the web browser 324, at step 506. More specifically, rather than launching the web browser 324 in a standard way on the personal computing device 104, e.g. as if the user had initiated launch of the web browser 324 themselves, the native application 326 launches the web browser 324 in a modified way. Specifically, the native application 326 launches the web browser 324 with suitable functionality for supporting the PWA 328. This includes native application 326 adding resources to the web browser 324 in the form of JavaScript code (or in other embodiments Python or another suitable computer language). The resources are generally part of the software of the native application 326. In other embodiments, they may be stored at the web server 422 and accessed by the native application 326, e.g. when the PWA 328 is downloaded from the web server 422. The resources may be specific to the operating system 322 of the personal computing device 104, e.g. the resources provided for Android® may be different to the resources provided for iOS®. The resources are added to libraries of the web browser 324 as objects. More specifically, they are added as part of the Document Object Model of the PWA 328.

The PWA 328 is launched on the web browser 324, at steps 508 and 510, by the web browser 324 being directed to the Uniform Resource Locator for the PWA 328. If it is the first time the web browser 324 is opening the URL, the web browser 324 uses the URL to download the files for running the PWA 328 from the remote server 114. The files for running the PWA 328 are received from the remote server 114 via the Internet 112. In the present embodiment, the files for running the PWA 328 are received over the long-range communication connection 120 from the remote server 114. In an alternative embodiment, the files for running the PWA 328 are received over the short-range wireless communication connection 118 with the access point 110. Once the web browser 324 downloads the required files, the web browser 324 launches the PWA 328, at step 510, and stores the files for running the PWA 328 in the browser storage 332 of the web browser 324, at step 512.

In other embodiments, the files required for the PWA 328 are stored elsewhere in the storage 306 of the personal computing device 104.

If the PWA 328 (e.g. the set of files required for the PWA 328) has been downloaded already, the web browser 324 retrieves the files for running the PWA 328 from the browser storage 332 or elsewhere in the storage 306 or memory 304 of the personal computing device 104. In this scenario, the files do not need to be stored again, and step 512 is therefore shown as optional in FIG. 5.

The files for running the PWA 328 include any one or more of the following files: HyperText Markup Language (HTML), JavaScript, Cascading Style Sheet (CSS), JavaScript Object Notation (JSON), eXtensible Markup Language (XML), images, or any other PWA related files. These files may be compressed and require decompression. The files for running the PWA 328 may be minified and/or obfuscated.

Figure 6A:
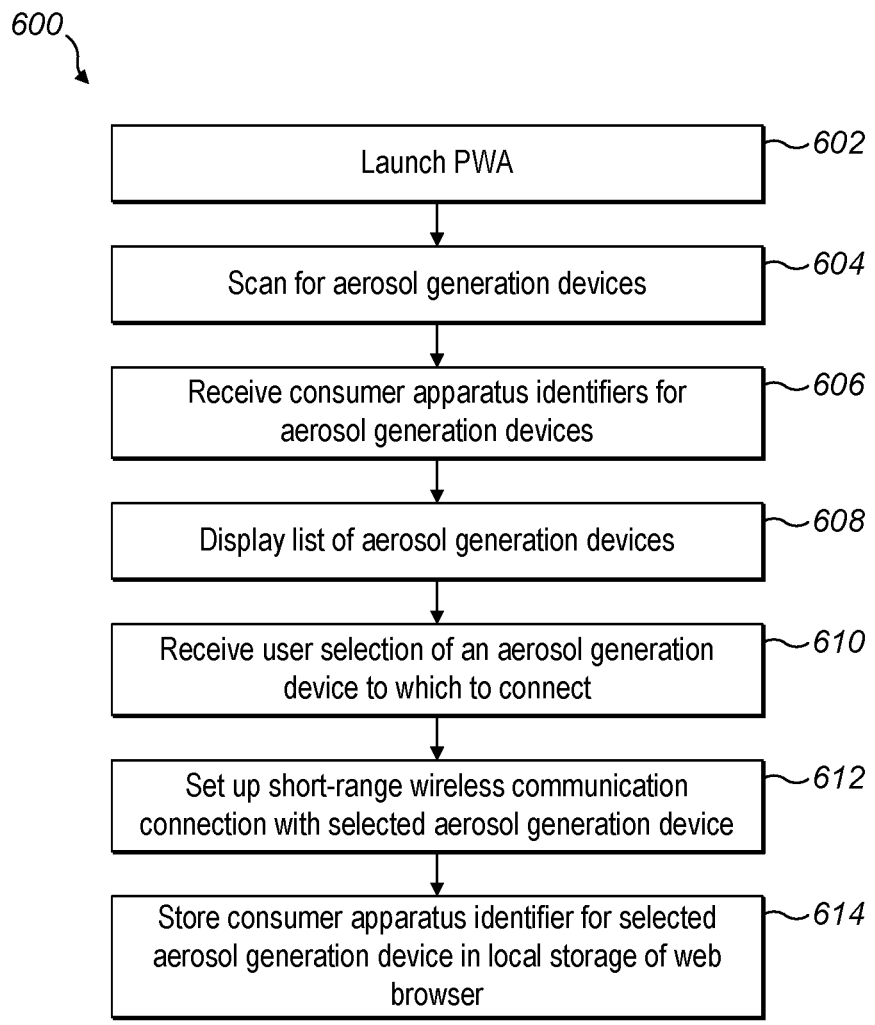
FIG. 6A is a flow diagram illustrating a method of establishing a short-range wireless communication connection between the personal computing device and the aerosol generation device.
Figure 6B:
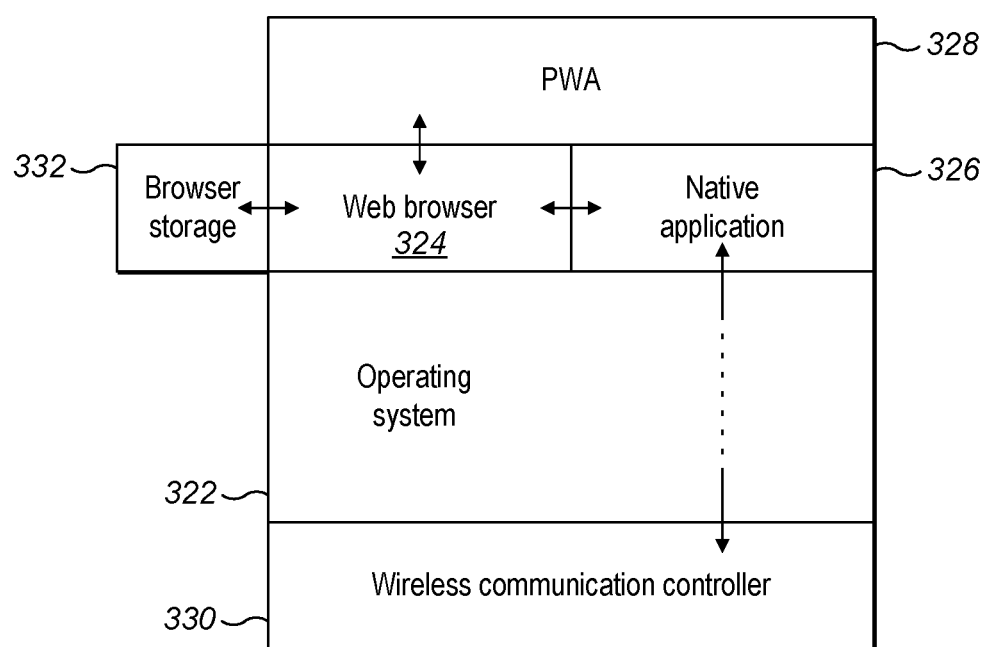
FIG. 6B is a schematic illustration of software layers on the personal computing device.

Referring to FIGS. 6A and 6B, a method 600 of establishing the short-range wireless communication connection 116 with one of the aerosol generation devices 102 and storing configuration information of aerosol generation device 102 comprises first launching the PWA 328, at step 602, using the method 500 of launching the PWA 328 described with reference to FIG. 5 above. Using the PWA 328, the user then initiates a command to scan for nearby aerosol generation devices 102, at step 604. The user initiates the command to scan for nearby aerosol generation devices 102 by interacting with the PWA 328 via the user interface 314 of the personal computing device 104. In this embodiment, the user initiates the scanning by selecting an icon within the PWA 328 displayed by the web browser 324. In alternative embodiments, the PWA 328 scans for aerosol generation devices 102 when the PWA 328 starts, at a certain time after the PWA 328 has started, periodically, at a set time in the day, when a timer triggers, when requested by the remote server 114, or when requested by the aerosol generation device 102.

The PWA 328 provides a call to initiate the scanning. In this embodiment, the PWA 328 uses a web browser short-range wireless communication function, e.g. the Web Bluetooth® API, to generate the call. The call may comprise JavaScript® roughly as follows:

```
navigator.bluetooth.requestDevice(options)
// Connect GATT server
.then(device => {
    log('> Name:           ' + device.name);
    log('> Id:             ' + device.id);
    log('> Connected:      ' + device.gatt.connected);
    return device.gatt.connect( );
})
```

Such a call would routinely be rejected by the web browser 324, as the web browser 324 does not inherently include functionality for communicating with the wireless communication controller 330. However, using the functionality added to the web browser 324 by the native application 326 when the native application 326 launched the web browser 324, the web browser 324 in its modified form, is able to respond to the call.

In more detail, the code causes the web browser 324 to access the object found in its directory at "navigator.bluetooth.requestDevice". In this embodiment, that object is JavaScript previously inserted by the native application 326 when the web browser 324 was launched. This code may comprise JavaScript® roughly as follows:

```
navigator.bluetooth = {
requestDevice: function(options) {
  var id = window.guid( );
  var p = new Promise(function(resolve, reject) {
    window.promises[id] = {
      resolve: resolve,
      reject: reject
    };
  });
  var message = {
    messageId: id,
    fn: 'requestDevice',
    parameters: options
  };
  var messageString = JSON.stringify(message);
  window.webkit.messageHandlers.notification.postMessage(messageString);
  return p;
}
```

So, when the PWA 328 generates the call to scan for aerosol generation devices 102, the web browser 324 processes the call using the object found in its directory at the appropriate location, e.g. using the code above. This code functions to provide a promise to the web browser 324. It also causes the web browser 324 to provide swift code to the native application 326. So, the web browser 324 effectively converts the call into a command to the native application 326. The swift code defining the command to the native application 326 may be roughly as follows:

```
let messageBody = message.body as! String
if let dataFromString = messageBody.data(using: .utf8,
  allowLossyConversion:
false) {
    do {
      let json = try JSON(data: dataFromString)
      try self.processJsonMessage(json: json)
    } catch {
    }
  }
```

The native application 326 receives the command and uses it to initiate the wireless communication controller 330 to scan for aerosol generation devices 102. Upon receipt of the command, the native application 326 executes the following code with the wireless communication controller 330:

```
case "requestDevice":
  var uuidServices = [CBUUID]( )
  var deviceName: String?
  if let filters = json["parameters"]["filters"].array {
    for filter in filters {
      if let name = filter["name"].string {
        deviceName = name
      }
      if let services = filter["services"].array {
        uuidServices = services.map { CBUUID(string:
$0.stringValue.uppercased( )) }
      }
    }
  }
  if let acceptAllDevices = parameters["acceptAllDevices"].bool {
    if acceptAllDevices {
      uuidServices = [ ]
      deviceName = nil
    }
  }
  print("Scan started for:")
  print(" - Services: \(uuidServices)")
  print(" - Device name: \(deviceName)")
```

-continued

```
  self.delegate?.startedScanning(name: deviceName, services:
    uuidServices)
  let scanFuture = self.manager.startScanning(forServiceUUIDs: nil)
  scanFuture.flatMap { [weak manager] discoveredPeripheral ->
FutureStream<Void> in
    self.delegate?.foundPeripheral(discoveredPeripheral)
    return FutureStream<Void>( )
  }
```

This causes the wireless communication controller 330 to control the communication interface 310 of the personal computing device 104 to scan for aerosol generation devices 102, at step 604. Any aerosol generation devices 102 that are within range, in a discoverable mode (or that are already paired to the personal computing device 104), and also have short-range wireless communication interfaces of the same protocol as the personal computing device 104 respond. The aerosol generation devices 102 respond with configuration information, comprising a consumer apparatus identifier. In the present embodiment, the consumer apparatus identifier is the Bluetooth® Media Access Control (MAC) address of the aerosol generation device 102.

The configuration information of each aerosol generation device 102 is received at wireless communication controller 330 of the personal computing device 104 and then sent to or retrieved by the PWA 328, at step 606. More specifically, the native application 326 receives a response from the wireless communication controller 330 that, in the present embodiment, comprises swift code roughly as follows:

```
func notify(uuid : String, contents : String) {
  let messageToSend = "window.notify('\(uuid)', \(contents))"
  self.webView.evaluateJavaScript(messageToSend) { (any, error) in }
}
```

It will be apparent that the PWA 328 makes calls to the Web Bluetooth® API in order to carry out tasks such as scanning for devices over the short-range wireless communication connection 116, or writing or receiving messages or data to and from the aerosol generation devices 102. In the present embodiment this is done in a manner which is agnostic as to which application is actually supporting the Web Bluetooth® API—i.e. the (unmodified) web browser 324 or the web browser 324 when appropriately modified by the native application 326. Preferably therefore the native application 326 is configured to determine if the web browser 324 can handle Web Bluetooth® API calls (in the desired manner) in which case it does not need to apply the code for modifying the web browser 324 to be able to handle Web Bluetooth® API calls (unless it needs them to be handled in a non-standard way for some reason in which case it can still modify the web browser 324 by effectively over-riding the standard functions for handling Web Bluetooth® API calls to perform the desired non-standard actions). This functionality is preferably handled by having the native application 326 query the web browser 324 for its name and version and comparing this with a look up table which specifies the correct actions to take (in terms of to what extent to modify the existing behaviour of the web browser 324) depending on the name and version of the web browser 324, the operating system 322 or of the personal computing device 104 itself.

With all of the configuration information of the aerosol generation device(s) 102 received 606, the personal computing device 104 displays a list of all of the candidate aerosol generation devices 102 on the user interface 314, at step 608.

A user selects which of the candidate aerosol generation devices 102 they would like to interact with. One or more may be selected. (Note, in an alternative embodiment, if only one aerosol generation device 102 is identified as being in range and it is one which the user has previously selected from the PWA 328, then the PWA 328 can automatically select that aerosol generation device 102 without requiring confirmation from the user thus effectively skipping displaying the list and receiving user selection and moving instead directly from receiving configuration information 606 to setting up the short-range wireless communication connection 116 with the aerosol generation device 102 as now described in greater detail below). The selection is received at the user device 102, at step 610.

The PWA 328 causes the personal computing device 104 to open the short-range communication connection 116 with the selected aerosol generation device 102, at step 612. The short-range wireless communication connection 116 is set up using some or all of the configuration information for the selected aerosol generation device(s) 102. In the present embodiment, the consumer apparatus identifier is used to set up the short-range wireless communication connection 116. In this example, the MAC address of the selected aerosol generation device(s) 102 is the consumer apparatus identifier.

Further configuration information may comprise any one or more of the following information indicative of the functioning of the aerosol generation device 102:
  Generic Attribute Profile Services (GATT) information,
  GATT UUIDs,
  GATT Characteristics,
  authentication information,
  capsule information,
  device settings,
  event information, and/or
  vaping information.

Capsule information, which is relevant in embodiments in which the aerosol generation device 102 takes a consumable item 217 in the form of a capsule or atomiser containing a reservoir of e-liquid to be vaporised, comprises an estimated number of puffs left in capsule and may include amount of e-liquid and/or nicotine left in the capsule. The capsule information is updated regularly, e.g. after every puff and/or when a user changes capsule, etc.

In this embodiment, device settings comprise sleep time and max puff duration. Event information comprises malfunction events, over temperature events and dry vape events. Vaping information comprises information about whether the user is using the aerosol generation device 102. It may further include information about duration, temperature, and capsule information.

The native application 326 receives the information indicative of the functioning of the aerosol generation device 102. The information indicative of the functioning of the aerosol generation device 102 is passed from the native application 326 to the PWA 328 via the web browser 324. The information indicative of the functioning of the aerosol generation device 102 is received at the PWA 328 and can be used by the PWA 328. For example, some or all of the information may be displayed to the user by the PWA on display 318 of the user interface 314 of the personal computing device.

The consumer apparatus identifier is stored in the browser storage 332 of the web browser 324 at step 612. All or a portion the information indicative of the functioning of the aerosol generation device 102 may also be stored in the browser storage 332 of the web browser 324. The storing is carried out by the PWA 328 and/or by the web browser 324. In some embodiments, the information is time stamped with the current time.

Referring to FIG. 7, a method 700 of initiating the short-range wireless communication connection 116 between the personal computing device 104 and the aerosol generation device 102 is shown. For example, after the short-range wireless communication connection 116 between the personal computing device 104 and the aerosol generation device 102 that has already been established using the method described with reference to FIGS. 6A and 6B has been closed, it can be re-initiated again using the method described with reference to FIG. 7.

First, the PWA 328 is launched on the personal computing device 104, at step 702, using the method 500 of launching the PWA 328 described above with reference to FIG. 5.

The browser storage 332 of the web browser 324 stores one or more consumer apparatus identifiers. The PWA 328 accesses the consumer apparatus identifiers, at step 704, from the browser storage 332. A determination of which aerosol generation device 102 to connect to is then made, at step 706. In the present embodiment, the consumer apparatus identifiers stored in the browser storage 332 are presented to the user on the user interface 314 of the personal computing device 104. The user selects which aerosol generation device 102 they wish to connect to. If there is only one aerosol generation device 102 then that aerosol generation device 102 is selected by the user (or may be selected on behalf of the user automatically).

In the present embodiment, the user interface 314 displays a user friendly name for the aerosol generation device 102 associated with the consumer apparatus identifier, e.g. as an icon. When the user interacts with the name or icon of the aerosol generation device 102, the consumer apparatus identifier associated with the aerosol generation device 102 is selected. In another embodiment, the consumer apparatus identifier is itself displayed.

The consumer apparatus identifier corresponding to the determined or selected aerosol generation device 102 is retrieved by the PWA 328 from the browser storage 332, at step 708. The PWA 328 uses the consumer apparatus identifier to cause the personal computing device 104 to initiate the short-range wireless communication connection 116 with the determined or selected aerosol generation device 102, at step 710. It will be appreciated that the consumer apparatus identifier has endured in the browser storage 332 from when the PWA 328 was last used, via the web browser 324 and the native application 326, to establish the short-range wireless communication connection 116. Even if the web browser 324 and native application 326 are themselves closed, e.g. are terminated or stop running, the consumer apparatus identifier remains in the browser storage. This allows the short-range wireless communication connection 116 to be initiated straightforwardly, without having to retrieve the consumer apparatus identifier from the aerosol generation device 102 again, e.g. by re-establishing the short-range wireless communication connection using the method 600 described with reference to FIGS. 6A and 6B.

In this embodiment, the consumer apparatus identifier is the Bluetooth® MAC address and is used to initiate the short-range wireless communication connection 116. In order to initiate the short-range wireless communication connection 116, the PWA 328 generates a call. The call seeks to cause the personal computing device 104 to establish the short-range wireless communication connection 116 with the aerosol generation device 102. The web browser 324 processes the call using the appropriate object found in its directory at the appropriate location. The code of the object functions to provide a promise to the web browser 324. It also causes the web browser 324 to provide swift code to the native application 326, such that the web browser 324 effectively converts the call into a command to the native application 326. The native application 326 receives the command and uses it to cause the wireless communication controller 330 to open the short-range wireless communication connection 116 with the aerosol generation device 102.

Referring to FIG. 8, a method 800 of transmitting information regarding the functioning of the aerosol generation device 102 to the remote server 114 is shown.

With the short-range wireless communication connection 116 between the personal computing device 104 and the selected aerosol generation device 102 already established and/or initiated, the personal computing device 104 receives from the selected aerosol generation device 102, information indicative of the functioning of the selected aerosol generation device 102 over the short-range wireless communication connection 116, at step 802.

In the present embodiment, the information indicative of the functioning of the selected aerosol generation device 102 may comprise any one or more of the following:
- identity and/or type of aerosol generation device 102, such as a model and serial number identifying the aerosol generation device 102,
- the type and identity of any consumable item 217 installed in the aerosol generation device 102,
- the status of the aerosol generation device 102 and/or of the consumable item 217 (if present) such as the battery level of the aerosol generation device 102 and current settings values of the aerosol generation device 102 (e.g. the target temperature setting or a "vapour volume" level setting) and information about the capacity of the consumable item 217 (e.g. the number of puffs remaining before the consumable item 217 will be considered to have expired, the amount of liquid remaining in the consumable item 217 if it includes a reservoir of liquid and/or details about the amount that the consumable item 217 has been used (see below) and/or
- information about the usage of the aerosol generation device 102 since a previous point in time since such information was successfully sent to the remote 114 server and/or the PWA 328.

The information indicative of the functioning of the selected aerosol generation device 102 is stored in the browser storage 332 of the web browser 324, at step 804. In the present embodiment, the information indicative of the functioning of the selected aerosol generation device 102 is also transmitted to the remote server 114 via the Internet 112, at step 808. In particular, the information indicative of the functioning of the selected aerosol generation device 102 is transmitted to the remote server 114 via the long-range wireless communication connection 120. In another embodiment, the information indicative of the functioning of the aerosol generation device 102 is transmitted 808 to the remote server 114 via the short-range wireless communication connection 118 via the access point 110.

In the present embodiment, the information indicative of the functioning of the selected aerosol generation device 102 is not transferred until a connection to the remote server 114 is determined to be available, at step 806. The determination is made by the personal computing device 104 attempting to contact the remote server 114 via the Internet 112. If a connection to the remote server 114 is determined to be available, the information indicative of the functioning of the selected aerosol generation device 102 is transmitted to the remote server 114. Note that in an alternative embodiment, some of the information indicative of the functioning of the aerosol generation device 102 is only transmitted to the personal computing device 104 if and only if the personal computing device 104 has determined that a connection to the remote server 114 is available and has communicated this as part of establishing and/or initiating the short-range wireless communication a connection 116 between the personal computing device 104 and the aerosol generation device 102. This particularly applies to any relatively large amounts of data (e.g. puff data history relating to the usage of the aerosol generation device 102 by a user—which may advantageously contain any one or more of the time and duration of each puff taken by the user, the target temperature setting at which each puff was taken and possibly the location of the aerosol generation device 102 at which each puff was taken). In particular, large batches of data such as these may be stored at the personal computing device 104 only until they have been transmitted to the remote server 114 successfully. Thus an example process flow, in overview, would be: receive at aerosol generation device 102 from personal computing device 104 confirmation that the device 104 has a connection to the remote server 114 available; transmit from apparatus 102 large information batch to the personal computing device 104; forward from personal computing device 104 to the remote server 114 large batch of information; receive confirmation from remote server 114 at the personal computing device 104 that the large information batch has been successfully received; send confirmation from personal computing device 104 to the aerosol generation device 102 that the large information batch has been successfully transmitted to the remote server 114; delete from the aerosol generation device 102 the successfully transmitted large information batch.

In a particularly preferred embodiment, the consumable item 217 is a cartomiser that includes a memory for storing data about the consumable 217, which information includes an identifier of the consumable 217, information about the consumable item 217 and preferably information such as the flavour of the consumable item 217, the nicotine strength of the consumable item 217 (e.g. mentholated tobacco flavour at 18 mg/ml concentration of nicotine) and most preferably includes information about the amount of liquid (estimated) to be remaining available in the consumable item 217 for consumption by a user. Most preferably the information about the amount of liquid estimated to be remaining in the consumable item 217 may be information about the usage of the consumable item 217 (e.g. puffs taken whilst containing the consumable item 217 and information about those puffs such as the settings of the aerosol generation device 102 during the puff, the duration of the puff, the energy consumed by the heating element 216 during the puff, ambient temperature or temperature of the heating element 216, prior to, or at the beginning of, the puff, etc) which may be aggregated (e.g. total energy consumed by the heating element whilst taking puffs from the consumable item 217, total puff duration of all puffs taken at different target temperatures or at different vapour volume settings, average ambient temperature or heating element temperature prior to or at the beginning of a puff, etc.) to minimise the memory required to store the data. Storing usage data rather than an actual estimated liquid level remaining is advantageous because then the server can estimate from this data how much liquid (or how many puffs) is (or are) remaining in the consumable item 217 using a sophisticated algorithm which may be improved over time or may take into account information from a large number of (possibly aggregated to avoid any issues relating to the misuse of personal information) to provide the most accurate information, etc. rather than relying on say the aerosol generation device 102 to have to perform such an estimation.

In the present embodiment, the personal computing device 104 is further configured to send information for the aerosol generation device 102 to the aerosol generation device 102 via the short-range wireless communication connection 116. The information may include any one or more of the following:

settings for the aerosol generation device 102, such as maximum power levels for the heating element 216,
operation enablement messages 1518*a*, 1518*b*, 1518*c*,
user authentication information, and
firmware updates for the aerosol generation device 102.

Once the short-range wireless communication connection 116 between the aerosol generation device 102 and the personal computing device 104 has been established, the short-range wireless communication connection 116 is used in methods of enabling an operation of the aerosol generation device 102. The skilled person will appreciate that other methods of establishing the short-range wireless connection 116 or other similar communication connections between the personal computing device 104 and the aerosol generation device 102 are possible, and the methods of enabling an operation of the aerosol generation device 102 can be used with these other methods and connections in other embodiments.

Referring to FIG. 9, in a first method 900 of enabling an operation of the aerosol generation device 102, the aerosol generation device 102 receives, at step 902, an operation enablement message 1518. The operation enablement message 1518 is either a server generated operation enablement message 1518*b* or a personal computing device operation enablement message 1518*c*. Once the operation enablement message 1518 is received at the aerosol generation device 102, it is considered an aerosol generation device held operation enablement message 1518*a*. The aerosol generation device held operation enablement message 1518*a* comprises verifiable data. In this embodiment, the verifiable data is a digital signature. The digital signature is typically a function of a private key of a public/private key pair and an operational enablement instruction, but in other embodiments the digital signature is distinct and the aerosol generation device held operation enablement message 1518*a* includes the operation enablement instruction separately from the verifiable data. The verifiable data, e.g., the digital signature or the function of the private key, is that generated by the remote server 114, e.g. the cryptography controller 420 of the remote server 114, and optionally stored in memory 404 and/or storage 406 of the remote server 114.

With the aerosol generation device held operation enablement message 1518*a* held on the aerosol generation device 102, the aerosol generation device 102 verifies, at step 904, the verifiable data.

The verification uses verification information. The verification information is stored by the aerosol generation device 102, e.g. in the memory 204 or storage 206 of the aerosol generation device 102. In one embodiment, the verification information is pre-installed on the aerosol generation device 102. More specifically, it is stored in the memory 204 or storage 206 of the aerosol generation device 102 at the time the aerosol generation device 102 is manufactured, or at the time that the computer executable code defining the instructions processed by the CPU 202 of the aerosol generation device 102 are stored in the memory 204 or the storage 206 of the aerosol generation device during manufacture or supply of the aerosol generation device 102 to the user. In other embodiments, the verification information is received at the aerosol generation device 102 over the short-range wireless communication connection 116 before being stored in the memory 204 or storage 206. In the illustrated embodiment, the verification information is a public key of the public/private key pair. The public/private key pair is generated by the cryptography controller 420 of the remote server 114. The private key is stored at the remote server 114, e.g. in the memory 404 or storage 406 of the remote server 114 and the public key is stored at the aerosol generation device 102, e.g. in the memory 204 or storage 206 of the aerosol generation device 102.

The verification comprises processing a cryptographic function involving the verification information and the aerosol generation device held operation enablement message 1518*a*. In more detail, in the illustrated embodiment, the public key is used to decrypt the operation enablement instruction contained in the aerosol generation device held operation enablement message 1518*a*. The purpose of the verification is to determine whether the aerosol generation device held operation enablement message 1518*a* is authentic, e.g. originates from or was signed by the remote server 114. This verification is a security feature. By requiring that the aerosol generation device held operation enablement message 1518*a* is authentic, e.g. signed using the private key stored at the remote server 114, then a nefarious user is unable to spoof the aerosol generation device held operation enablement message 1518*a* and therefore unable to enable the operation of the aerosol generation device 102 without the involvement of the remote server 114. The security and assurance this verification provides is improved by the private key remaining secret, e.g. by only the remote server 114 or devices similarly authorised being able to generate an authentic aerosol generation device held operation enablement message 1518*a*. As described with reference to FIG. 15B, the further embodiments show that server generated operation enablement message 1518*b* and the personal computing device generated operation enablement message 1518*c* are both able to generate authentic messages. In this embodiment, the public key is pre-installed on the aerosol generation device 102 before the user purchases the aerosol generation device 102.

The enablement step can also be viewed as an "unlocking" of the aerosol generation device 102. The aerosol generation device 102, before it has been enabled, is locked out to a user until they have been verified. In particular, the aerosol generation device 102 is locked until the user's age has been verified.

An operation of the aerosol generation is enabled 906 based on the outcome of the verification 904 step.

In this embodiment, the method 900 further comprises opening a short-range wireless communication connection 116 between the aerosol generation device 102 and the personal computing device 104. Specifically, the short-range wireless communication connection 116 is a Bluetooth® connection. More specifically, the Bluetooth® connection is a Bluetooth® Low Energy (BLE) connection.

In this embodiment, the method 900 described with respect to FIG. 9 further comprises transmitting an operation enablement request 1512. The reception 902 of the aerosol generation device held operation enablement message 1518 is in response to the aerosol generation device 102 transmitting the aerosol generation device originating operation enablement request 1512*a*. The operation enablement request 1512*a* is transmitted to the personal computing device 104.

Referring to FIG. 10, a method 1000 of disabling an operation of the aerosol generation device 102 is shown. In this embodiment, an operation of the aerosol generation device 102 is enabled 1002. In this embodiment, the enablement 1002 of an operation is substantially the same enablement 906 step of the method 900 as described with respect to FIG. 9.

The disablement 1008 of the operation of the aerosol generation device 102 is performed at the end of a period of time commencing from a time at which the operation of the aerosol generation device 102 is enabled 1002.

In particular, the disablement 1008 occurs when a disablement timer runs out 1006. The disablement timer is started 1004 at the same time or shortly after the enablement 1002 of the operation of the aerosol generation device 102.

The disabling 1006 of the operation of the aerosol generation device 102 occurs more than one day and less than one week after the enabling 1002 operation of the aerosol generation device 102.

Upon the operation of the aerosol generation device 102 being disabled, the aerosol generation device 102 sends 1010 an operation enablement request 1512. An operation enablement message 1518 is received 1012 in response to the request and stored as an aerosol generation device held operation enablement message 1518*a*. The operation of the aerosol generation device is re-enabled 1016 depending on the aerosol generation device held operation enablement message 1518*a* and the verification 1014 of the verifiable data.

In the present embodiment, the receiving operational enablement 1012, verifying verifiable data 1014, and re-enablement 1016 of the operation of the aerosol generation device 102 are the same steps as shown with respect to FIG. 9 with specific reference to the receive 902 operation enablement message 1518, verify data 904 and enable the operation 906 steps.

In an alternative embodiment, the receiving 1012 operational enablement message 1518, verifying verifiable data 1014, and re-enablement 1016 of the operation of the aerosol generation device 102 are new steps and function differently to the method 900 of FIG. 9.

Figure 11:
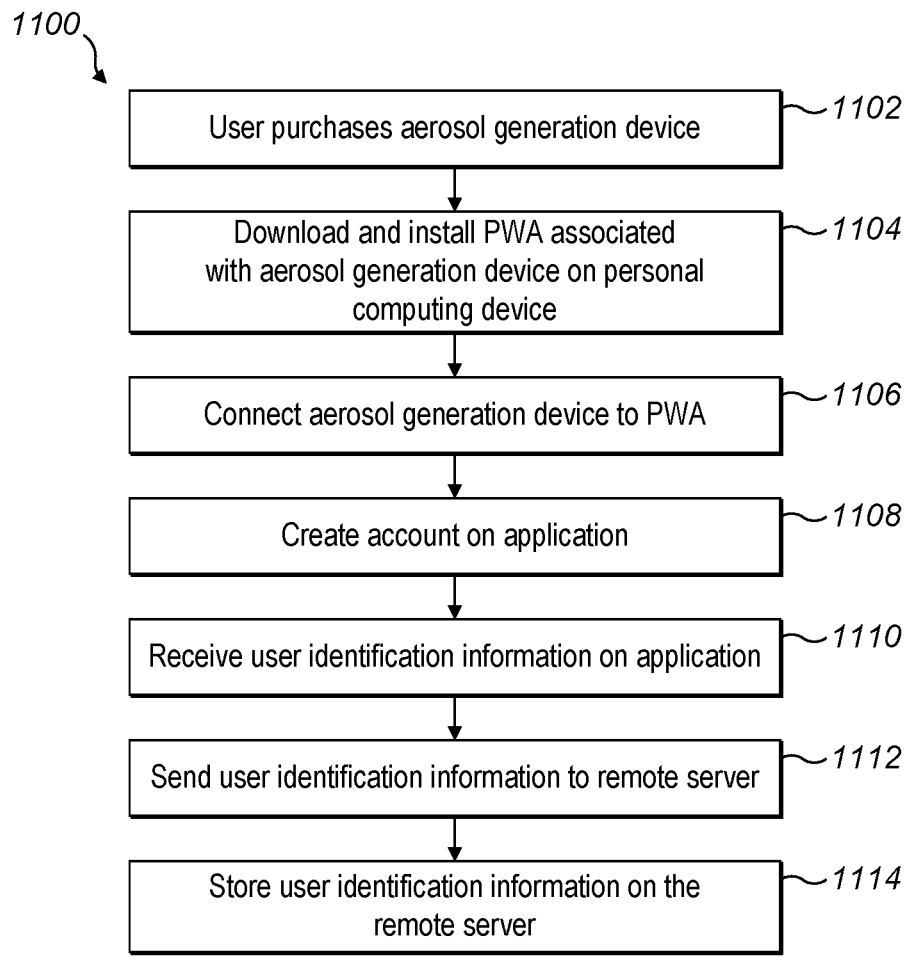
FIG. 11 is a flow diagram illustrating a method of a user purchasing and registering their first aerosol generation device.

Referring to FIG. 11, a method 1100 of a user purchasing and registering their first aerosol generation device 102 is shown. In this method 1100, this is the first aerosol generation device 102 a user has purchased and/or registered. The user has also never registered an account.

The user purchases or receives 1102 an aerosol generation device 102. Depending on local laws, when purchasing the aerosol generation device 102, the user's age is verified by the aerosol generation device 102 vendor.

The user downloads and installs 1104 the application associated with the aerosol generation device 102 onto their personal computing device 104. In this embodiment, the user access a URL that is present on the packaging or user interface 212 of the aerosol generation device 102 using their personal computing device 104. The URL points to a website to download the application associated with the aerosol generation device. In particular, the step of accessing of the URL is the user scanning a barcode that encodes the URL. Specifically, the barcode is a 2D barcode. Alternatively or in addition, the URL is presented in plain text for the user to type into the web browser 316 of the personal computing device 104.

In this embodiment, the application associated with the aerosol generation device 102 is the PWA 322. In an alternative embodiment, the application associated with the aerosol generation device 102 is a native application and is installed using the person computing device's 104 software repository or application store.

The user, using the PWA 322 running on the personal computing device 104, creates 1108 an account which generates sundry account creation data. Sundry data includes any one or more of the following pieces of information:
  date of account creation,
  date application was downloaded,
  personal computing device 104 type and operation system,
  address of the user,
  email of the user, and/or
  password of the user.

The account creation process comprises receiving 1110 user identification information. The user identification information comprises data indicative of the age of the user. In particular in this embodiment, the user identification information comprises the user's name, birth date, and data indicative of a proof of the user's age. The receiving 1110, in this embodiment, comprises the user inputting their name and birthdate and capturing an image of a document which is proof of age on the personal computing device 102. For example, the data indicative of a proof of a user's age is a photo of the user's driver's licence.

A user registration request 1504 is generated. The user registration request 1504 comprises the received user information and sundry account creation details.

The registration request is transmitted from the personal computing device 104 to the remote server 114.

The remote server 114 creates 1114 the account and stores the user identification information in the user database 408.

The remote server 114 verifies the legitimacy of the user identification information. The verification by the remote server 114 comprises an operator reviewing the user identification information for authenticity.

The PWA 322, once installed and running on the personal computing device 104, is connected to the aerosol generation device 102. The step of connecting 1106 the personal computing device 104 to the aerosol generation device 102 may be performed any time during the user account creation.

In another embodiment, the user uses a wired connection between the personal computing device 104 and the aerosol generation device 102.

Information regarding the aerosol generation device 102 is transmitted to the remote server 114 and associated with the user account that is stored in the user database 408. The information regarding the aerosol generation device 102 is transmitted with the user identification information and account creation details in step 1112. Alternatively, the information regarding the aerosol generation device 102 is transmitted at a later time. Information regarding the aerosol generation device comprises any one or more of the following:
- type,
- consumable inserted,
- colour,
- warranty, and/or
- heating element 210 maximum power output.

The enablement of the operation of the aerosol generation device 102 occurs later and according to the method 900 as described with reference to FIG. 9.

In an alternative embodiment, once the user identification information is stored 1114 and verified by the remote server 114, the remote server sends an server generated operation enablement message 1518b to the personal computing device 104. The personal computing device 104 sends the server generated operation enablement message 1518b to the aerosol generation device 102. The aerosol generation device 102 enables the operation of the aerosol generation device 102.

Figure 12:
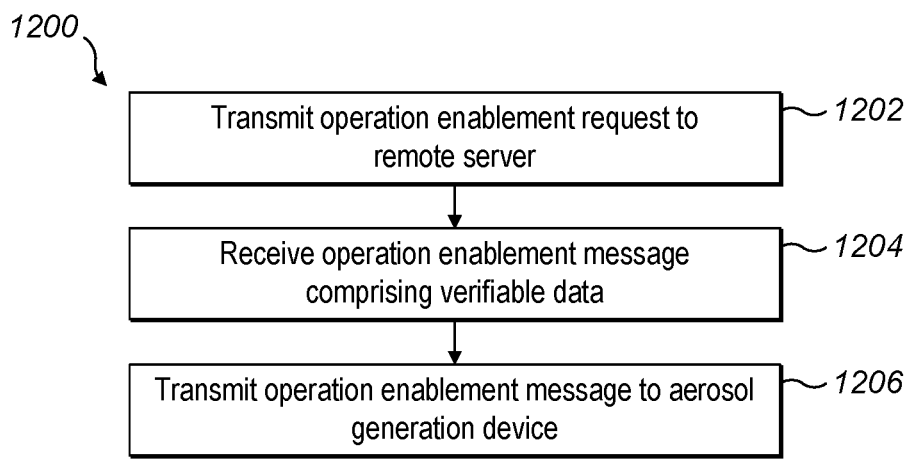
FIG. 12 is a flow diagram illustrating a method of the personal computing device facilitating the method of enabling the operation of the aerosol generation device.

Referring to FIG. 12, the method 1200 of an enabling an operation of the aerosol generation device 102 is shown. The method 1200 is presented from the point of view of the personal computing device 104.

The personal computing device 104 transmits 1202 an operation enablement request 1512 to the remote server 114.

The personal computing device 104 receives 1204 the server generated operation enablement message 1518b from the remote server 114.

The server generated operation enablement message 1518b is transmitted 1206 to the aerosol generation device 102. The transmission 1206 of the operation enablement message 1518 is over a short-range wireless communication connection 116. In this embodiment, the method 1200 of enabling an operation of the aerosol generation device 102 further comprises receiving the aerosol generation device originating operation enablement request 1512a from the aerosol generation device 102. This reception triggers the personal computing device 104 to forward the request to the remote server 114. Alternatively, a user interacts with the personal computing device 104 to trigger the operational enablement request 1512 and forwards the operational enablement request 1512 to the remote server 114.

In this embodiment, the method 1200 of enabling an operation of the aerosol generation device 102 further comprises storing the server generated operation enablement message 1518b. The server generated operation enablement message 1518b is stored on the personal computing device 104. In particular, the server generated operation enablement message 1518b is stored on the local storage 318 of the web browser 316. The PWA 322 is configured to be able to receive or retrieve the server generated operation enablement message 1518b from the local storage 318. In this way, the personal computing device 104 behaves as a cache for the operation enablement message 1518. The server generated operation enablement message 1518b is stored such that the personal computing device 104 can obtain the server generated operation enablement message 1518b if required later.

In an alternative embodiment, the server generated operation enablement message 1518b is not stored and deleted from the personal computing device 104 immediately.

In this embodiment, the method 1200 of enabling an operation of the aerosol generation device 102 further comprises receiving an aerosol generation device originating operation enablement request 1512a at the personal computing device 104 from the aerosol generation device 102.

In an alternative embodiment, the personal computing device 104 is configured to operate as device to transparently relay messages between the aerosol generation device 102 and the remote server 114. The transparent relay is in the form of a tunnelling protocol. The tunnelling protocol provides transparent HyperText Transfer Protocol (HTTP) requests to and from the aerosol generation device 102 to and from the Internet 112 and/or the remote server 114. The HTTP protocol is tunnelled over the underlying short-range wireless communication connection 116, such as Bluetooth®.

Figure 13A:
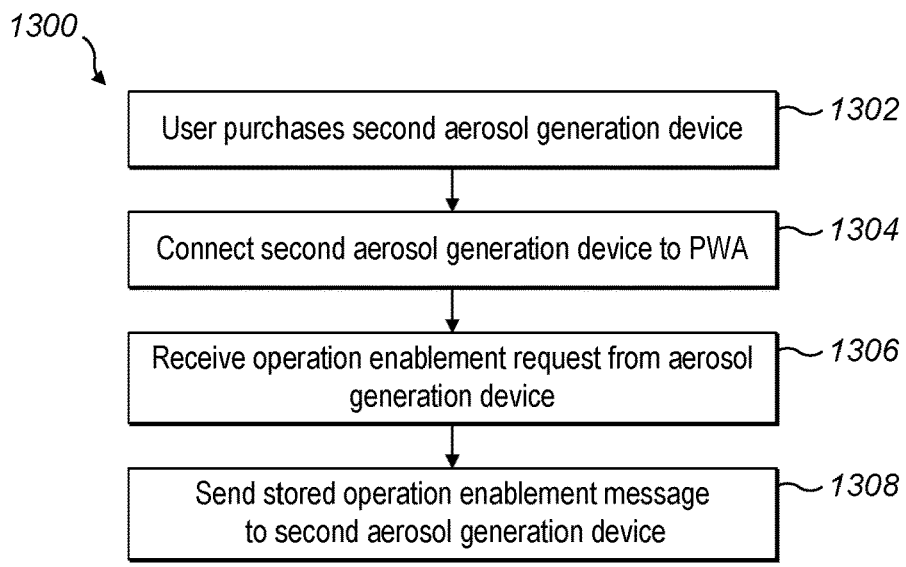
FIGS. 13A and 13B are flow diagrams illustrating methods of enabling an operation of the user's second aerosol generation device.
Figure 13B:
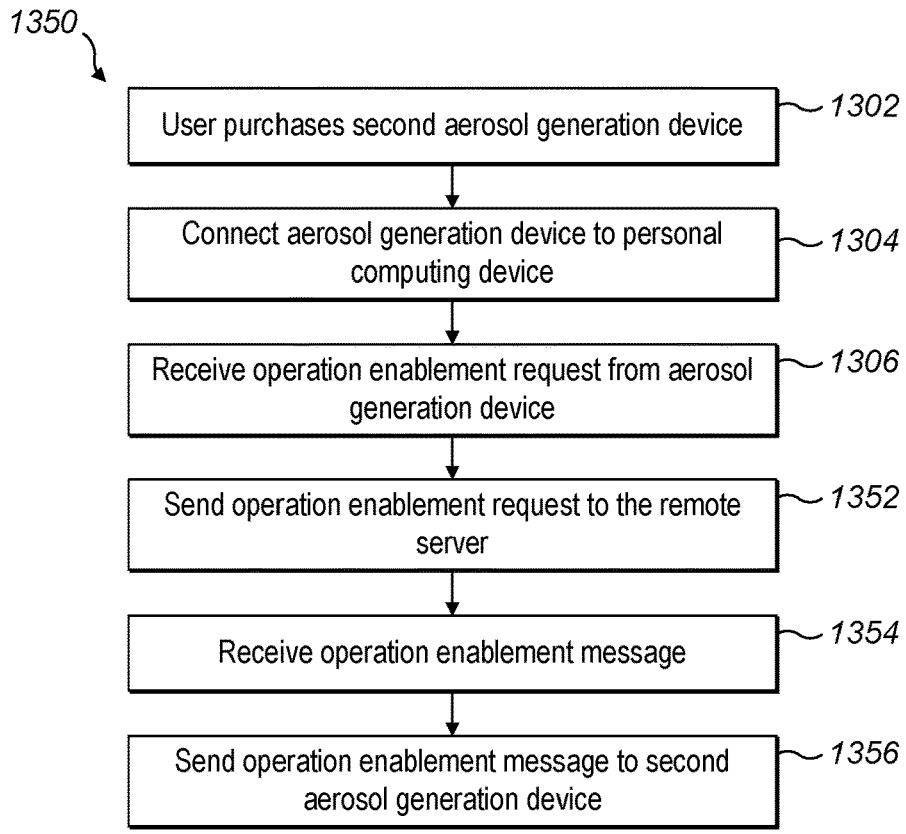
Figure 15A:
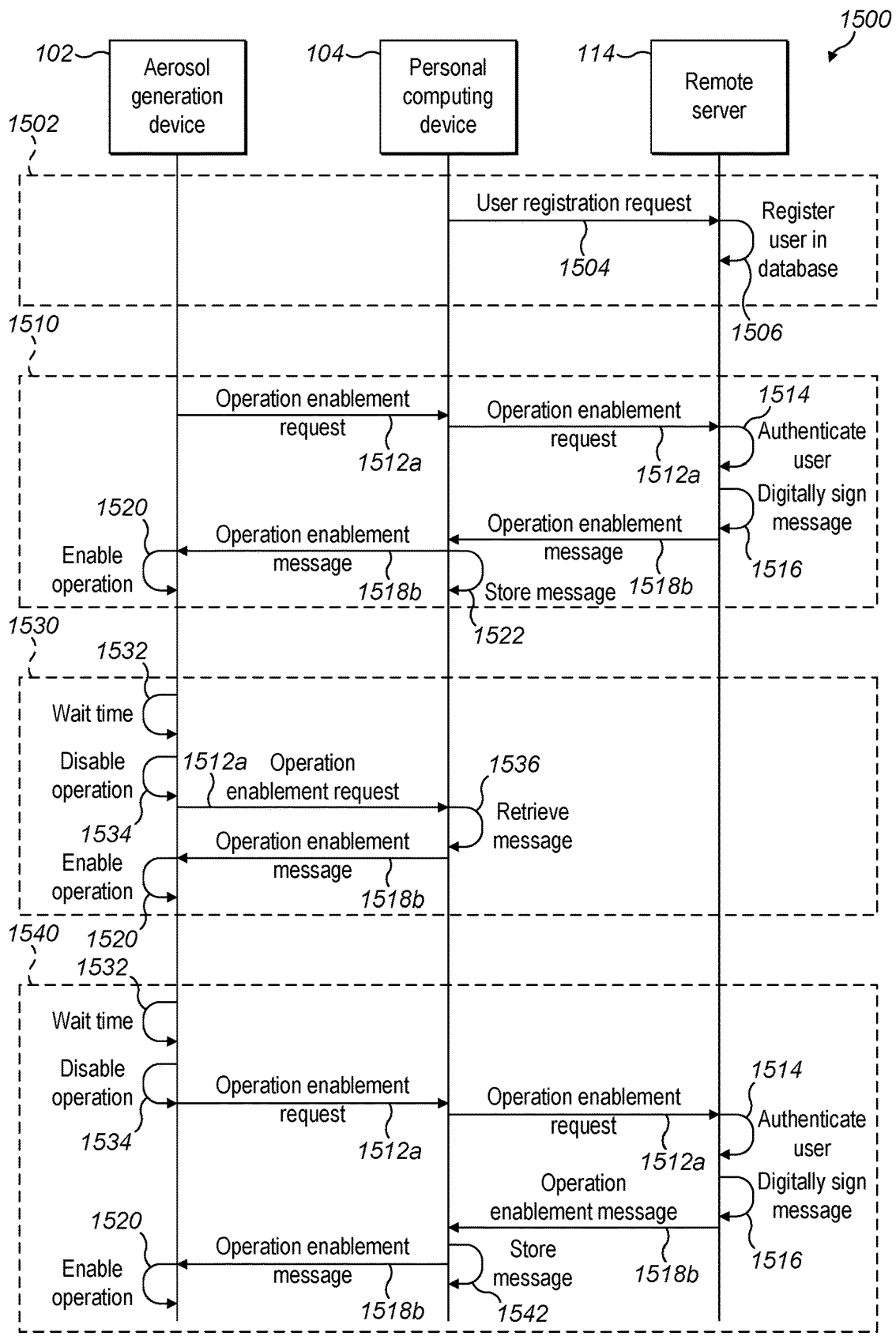
FIGS. 15A and 15B are a schematic diagrams illustrating communication between the aerosol generation device, personal computing device and remote server during operation enablement.

Referring to FIGS. 13A and 13B, two methods 1300, 1350 of a user purchasing a second aerosol generation device 102 are shown. The two methods 1300, 1350 may be used separately or together. The methods 1300, 1350 of FIGS. 13A and 13B presume that the user has registered account and/or the operation of the first aerosol generation device 102 has been enabled. The method 1300 shown in FIG. 13A describes the steps to take when the personal computing device 104 is not connected to the Internet 112 and an operation of the aerosol generation device 102 needs to be enabled. The enablement aspects of this method 1300 are substantially the same as the enablement process 1530 described with reference to FIGS. 15A and 15B. The method 1350 shown in FIG. 13B describes when the personal computing device 104 is connected to the internet and an operation of the aerosol generation device 102 needs to be enabled. The enablement aspects of this method 1350 are substantially the same as the enablement process 1540 described with reference to FIGS. 15A and 15B.

The user purchases 1302 a second aerosol generation device 102 and connects 1106 the aerosol generation device 102 to the PWA 322 running on the personal computing device 104.

The aerosol generation device 102 generates an operation enablement request 1512 and transmits it to the personal computing device 104. The personal computing device 104 receives the operation enablement request 1512.

The PWA 322 running on the personal computing device 104 receives 1306 the operation enablement request 1512 via the Bluetooth® Web API from the personal computing device 104 via the web browser 316.

Referring to method 1300 of FIG. 13A, the PWA 322 is configured to retrieve or receive, from the local storage 318 of the web browser 316, the stored server generated operation enablement message 1518b that was received for use with the first configured aerosol generation device 102. This stored server generated operation enablement message 1518b is a "cached" operation enablement message 1518.

The PWA 322 is configured to send the received or retrieved operation enablement message 1518 and send 1308 it to the second aerosol generation device 102. The PWA 322 uses the Bluetooth® Web API to send the operation enablement message 1518 via the short-range communications connection 116 which is a Bluetooth® connection.

The PWA 322 is configured to limit the number of times the cached server generated operation enablement message 1518*b* can be used. For example, the server generated operation enablement message 1518*b* can only be used once.

Referring to the method 1350 of FIG. 13B, the PWA 322 is configured to transmit 1352 the operation enablement request 1512 received from the aerosol generation device 102 to the remote server 114.

The PWA 322 is further configured to receive or retrieve, from the local storage 332 of the web browser 324, session data relating to a connection session between the PWA 322 and the remote server 114. The local storage 332 also contains session timeout information that is used to indicate to the PWA 322 whether the session data is still valid. The session data is used to seamlessly validate the user and other data if the device request for validation against a mobile app which has already a session opened.

The remote server 114 processes the operation enablement request 1512 and transmits a server generated operation enablement message 1518*b* in response.

The server generated operation enablement message 1518*b* is received 1354 at the personal computing device 104 where. The PWA 322 transmits 1356 the server generated operation enablement message 1518*b* to the second aerosol generation device.

The newly received server generated operation enablement message 1518*b* is stored in the local storage 332 of the web browser 324 of the personal computing device 104. When storing the newly received operation enablement message 1518, older enablement messages are removed and/or invalidated. Alternatively, all enablement messages are removed except for the one with the longest time before it becomes invalid.

In an alternative embodiment, only the method 1350 shown in FIG. 13B is used and the method 1300 shown in FIG. 13A is not used. As such, the operation of the aerosol generation device 102 cannot be enabled if the personal computing device 104 is not connected to the Internet 112 and/or remote server 114.

When the personal computing device sends 1308, 1356 the server generated operation enablement message 1518*b* or a personal computing device generation enablement message 1518*c* to the aerosol generation device 102, the operation of the aerosol generation device 102 is enabled as described with to the enablement step 906, 1016.

Referring to FIG. 14A, a method 1400 of authenticating a user and digitally signing the result is shown from the perspective of the remote server 114.

A request to enable an operation of the aerosol generation device 102 is received 1402 at the remote server 114. In the present embodiment, the operation enablement request 1512 comprises data indicative of an age of the user.

In another embodiment, the operation enablement request 1512 comprises data indicative of a user and the remote server 114 is configured to then retrieve or receive the age of the user from the user database 408 using the data indicative of the user. Alternatively, the operation enablement request 1512 comprises data indicative of a aerosol generation device 102 identifier and the remote server 114 is configured to then retrieve or receive the age of the user of the aerosol generation device 102. Optionally, operation enablement request 1512 comprises the specific operation of the aerosol generation device 102 to be enabled.

The authentication controller 418 authenticates 1404 the user. The authentication step 1404 comprises comparing the age of a user to a threshold age. With the data indicative of the age of the user, the authentication controller 418 running on the remote server 114 is configured compare the age of the user to a threshold age. The threshold age is the age at which the user is legally allowed to use the aerosol generation device 102 to smoke. In particular, the threshold age is the age at which the user is legally allowed to use the aerosol generation device 102 to smoke consumables that contain nicotine.

A server generated operation enablement message 1518*b* is generated 1406 by the authentication controller 418. The server generated operation enablement message 1518*b* depends on the result of authentication step 1404.

The server generated operation enablement message 1518*b* is digitally signed 1408 using the private key stored on the remote server 114. The private key corresponds to the public key stored on the aerosol generation device 102.

The server generated operation enablement message 1518*b* and the digital signature of the server generated operation enablement message 1518*b* are sent 1140 to the device that initially sent the request to enable an operation of the aerosol generation device 102. In this embodiment, server generated operation enablement message 1518*b* and the digital signature of the server generated operation enablement message 1518*b* are sent to the personal computing device 104.

The cryptography controller 420 is configured to digitally sign the sever generated operation enablement message 1518*b*.

Referring to FIG. 14B, a method 1450 of registering a user is shown from the perspective of the remote server 114.

The remote server 114 receives 1452 a registration request from the personal computing device 104.

The registration request comprises user information and sundry account creation details.

The user information comprises at least the name of the user, the birth date of the user, and data indicative of proof the age of the user. In particular, the data indicative of a proof of a user's age is a photo of the user's driver's licence.

The authentication controller 418 creates an account in the user database 408 and stores the user information and the sundry account creation details.

Referring to FIGS. 15A and 15B, a schematic diagram showing data communication and inputs between devices is shown. The system 1500 of FIGS. 15A and 15B presents an alternative view of some of the processes described in the disclosure with reference to the present embodiment.

The system 1500 of FIGS. 15A and 15B is the present embodiment, presented as a system to show data movement, data directions, data inputs, and data outputs between the aerosol generation device 102, personal computing device 104, and the remote server 114.

FIGS. 15A and 15B present six distinct processes that different embodiments use in any different combination or distinctly:

- registering 1502 a user,
- enabling 1510 an operation of the aerosol generation device 102,
- disabling and re-enabling 1530 the aerosol generation device 102 using a stored operation enablement message 1518,
- disabling and re-enabling 1540 the aerosol generation device 102 using the remote server 114,
- a further process of enabling 1550 an operation of the aerosol generation device 102 using an aerosol generation device held operation enablement message 1518*a*,
- receiving and storing 1560 an operation enablement message 1518*b*, 1518*c* as an aerosol generation device held operation enablement message 1518*a*, a requesting and receiving an aerosol generation device held operation enablement message 1518*a*.

The registering 1502 processes comprises the user registration request 1504 being sent from the personal computing device 104 to the remote server 114. The remote server 114 then registers 1506 the user in the user database 408. The process is also described in the method 1100 with reference to FIG. 11.

The enabling 1510 the operation of the aerosol generation device 102 processes comprises the aerosol generation device 102 sending an operation enablement request 1512 to the personal computing device 104. In this embodiment the operation enablement request 1512 is an aerosol generation device originating operation enablement request 1512*a*. The personal computing device 104 sends the operation enablement request 1512 to the remote server 114. The remote server 114 authenticates 1514 the user using information from the operation enablement request 1512. Remote server 114 generates and digitally signs 1516 the server generated operation enablement message 1518*b*. The remote server 114 sends the server generated operation enablement message 1518*b* to the personal computing device 104. The personal computing device 104 sends the server generated operation enablement message 1518*b* to the aerosol generation device 102. The aerosol generation device proceeds to enable 1520 an operation of the aerosol generation device 102. The process is also described in the method 900 with reference to FIG. 9.

When the personal computing device 104 receives the server generated operation enablement message 1518*b*, it stores it for later use. The server generated operation enablement message 1518*b* is considered cached on the personal computing device 104.

The disabling and re-enabling 1530 of the aerosol generation device 102 using a stored server generated operation enablement message 1518*b* starts with an enabled aerosol generation device 102. The enable time period is run down 1532 and the operation of the aerosol generation device is disabled 1534. The aerosol generation device 102 sends an aerosol generation device originating operation enablement request 1512*a* to the personal computing device 104. In this example, the connection between the personal computing device 104 and the remote server 114 cannot be established. The personal computing device 104 has a valid server generated operational enablement message 1518*b* stored or "cached" on the personal computing device 104. The personal computing device 104, via the PWA 322, receives or retrieves 1536, from the local storage 318 of the web browser 316, the "cached" operation enablement message 1518. The personal computing device 104 sends the operation enablement message 1518 to the aerosol generation device 102. The aerosol generation device proceeds to enable 1520 the operation of the aerosol generation device 102.

The disabling and re-enabling 1540 of the aerosol generation device 102 using a stored server generated operation enablement message 1518 starts with an enabled aerosol generation device 102. The enable time period is run down 1532 and the operation of the aerosol generation device is disabled 1534. The aerosol generation device 102 sends an aerosol generation device originating operation enablement request 1512*a* to the personal computing device 104. In this example, the connection between the personal computing device 104 and the remote server 114 can be established and/or the personal computing device 104 does not have a valid server generated operational enablement message 1518*b* stored or "cached". The personal computing device 104 sends the operation enablement request 1512 to the remote server 114. In another embodiment, before sending the operation enablement request 1512, the personal computing device 104 already has an active connection to the remote server 114. In this alternative embodiment, the personal computing device retrieves session data relating to the pre-established connection such that the personal computing device 104 sends the operation enablement request 1512 over the pre-established connection. The remote server 114 authenticates 1514 the user using information from the operation enablement request 1512. Remote server 114 generates and digitally signs 1516 the server generated operation enablement message 1518*b*. The remote server 114 sends the server generated operation enablement message 1518*b* to the personal computing device 104. The personal computing device 104 sends the server generated operation enablement message 1518*b* to the aerosol generation device 102. The personal computing device 104 receives the server generated operation enablement message 1518*b* and stores it for later use. The server generated operation enablement message 1518*b* is considered cached on the personal computing device 104. The aerosol generation device proceeds to enable 1520 an operation of the aerosol generation device 102.

In an alternative embodiment, the disabling and re-enabling 1530 of the aerosol generation device 102 using a stored server generated operation enablement message 1518 is not used. As such, the operation of the aerosol generation device 102 cannot be enabled if the personal computing device 104 is not connected to the Internet 112 and/or remote server 114.

Operation enablement messages 1518, 1518*a*, 1518*b*, 1518*c* include a verification time. The verification time is length of the period of time the operation is enabled for. In this embodiment, the verification time is the length of time the disablement timer is set for.

In an embodiment, a further process of enabling 1550 an operation of the aerosol generation device 102 starts with the aerosol generation device 102 determining 1552 whether the aerosol generation device held operation enablement message 1518*a* is valid or invalid. In the present embodiment, the aerosol generation device held operation enablement message 1518*a* is already stored on the aerosol generation device 102 and is accessed from the storage 206 of the aerosol generation device 102.

In an alternative embodiment, the aerosol generation device held operation enablement message 1518*a* is not stored in the storage 206 of the aerosol generation device 102. In this embodiment, the aerosol generation device held operation enablement message 1518*a* is received from the personal computing device 104. The receiving of the aerosol generation device held operation enablement message 1518*a* is conducted according to the receiving and storing process 1560 for an operation enablement message 1518*a*, 1518*b*, 1518*c* as described below with reference to FIG. 15B. Preferably, this is receiving the server generated operation enablement message (1508*b*) or the personal computing device operation enablement message (1518*c*) and using it as the aerosol generation device held operation enablement message (1518*a*).

The operation of the aerosol generation device 102 is enabled 1554 if the aerosol generation device held operation enablement message 1518*a* is determined to be valid. Or, in other words, the aerosol generation device 102 determines whether an aerosol generation device held operation enablement message 1518*a* is valid or invalid, and enables the operation if the aerosol generation device held operation enablement message 1518a is determined to be valid.

In an embodiment, a receiving and storing process 1560 of the operation enablement message 1518a, 1518b, 1518c begins with the personal computing device attempting to obtain 1562 a server generated operation enablement message 1518b.

In the present embodiment, obtaining the server generated operation enablement message 1518b depends on whether the server generated operation enablement message 1518b is present on the personal computing device 104 (i.e. has the server generated operation enablement message 1518b stored in the storage 306 or memory 304 of the personal computing device 104, or in particular, the local storage 318 of the web browser 316 of the personal computing device 104) or not and if present on the personal computing device 104, whether the server generated operation enablement message 1518b is valid. If the server generated operation enablement message 1518b is present on the personal computing device 104, then the personal computing device 104 retrieves 1564 the server generated operation enablement message 1518b from its memory 304 or storage 306, or local storage 318 of the web browser 316. Preferably, the step of obtaining the server generated operation enablement message 1518b comprises attempting to retrieve the server generated operation enablement message 1518b from a storage, preferably from a/the local storage 318 of a/the web browser 316.

If the server generated operation enablement message 1518b is not present on the personal computing device 104 or if the server generated operation enablement message 1518b is not valid, then the personal computing device 104 requests the server generated operation enablement message 1518b from the remote server 114. Preferably, this is conducted by the personal computing device transmitting an operation enablement request 1512, 1512a to the remote server 114. Optionally, the operation enablement request 1512, 1512a originates from the aerosol generation device 104 and is a aerosol generation device originating operation enablement request 1512. Optionally, the personal computing device 104 generates the operation enablement request 1512.

Figure 14A:
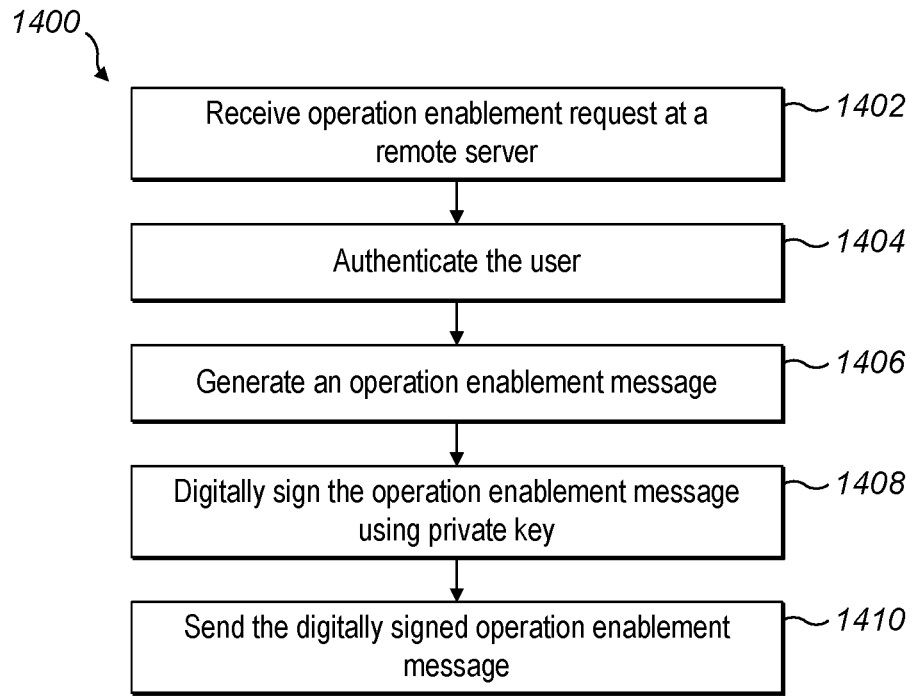
FIGS. 14A and 14B are flow diagrams illustrating methods of a remote server authenticating and registering the user.
Figure 14B:
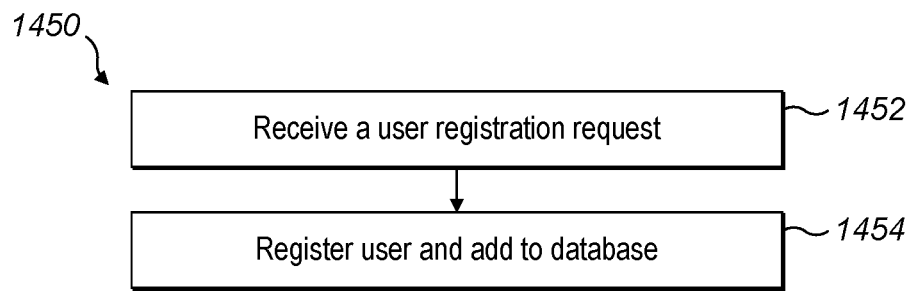

The remote server obtains 1566 the server generated operation enablement message 1518b and transmits the server generated operation enablement message 1518b back to the personal computing device. The request, obtaining, and receipt of the server generated operation enablement message 1518b at the personal computing device 104 in this embodiment is substantially the same as described with reference to FIG. 14A. Alternative methods of requesting, obtaining and receiving of the server generated operation enablement message 1518b at the remote server are also possible.

In an alternative embodiment, the personal computing device 104 is not capable of checking the validity of the server generated operation enablement message 1518b and will request the server generated operation enablement message 1518b from the server only when one is not present on the personal computing device 104.

In a further alternative embodiment, the personal computing device 104 does not store the server generated operation enablement message 1518b and will attempt to obtain the server generated operation enablement message 1518b from the remote server 114 every time.

If the personal computing device 104 is unable to obtain a server generated operation enablement message 1518b, the personal computing device 104 generates a personal computing operation enablement message 1518c.

With the server generated operation enablement message 1518b or the personal computing operation enablement message 1518c obtained 1562 on the personal computing device, the personal computing device 104 transmits the operation enablement message 1518b, 1518c to the aerosol generation device 102. The aerosol generation device 102 stores the operation enablement message 1518b, 1518c as the aerosol generation device held operation enablement message 1518a.

Both the server generated operation enablement message 1518b and the personal computing operation enablement message 1518c are valid for specified periods of time. The server generated operation enablement message 1518b is valid for a longer time than the personal computing operation enablement message 1518c. In the present embodiment, the operation enablement messages 1518, 1518a, 1518b, 1518c comprise data indicative of the period of time they are valid. Alternatively, the aerosol generation device identifies the source of the aerosol generation device held operation enablement message(s) 1518a and determines the period of time they are valid for based on the source and when the aerosol generation device held operation enablement message(s) 1518a were received.

When either or both the server generated operation enablement message 1518b or the personal computing operation enablement message 1518c are present on the aerosol generation device 102, they are considered the aerosol generation device held operation enablement message(s) 1518a. In the present embodiment, only the operation enablement message 1518b, 1518c with the longest period of validity is stored on the aerosol generation device 102. Alternatively, both of the operation enablement message 1518b, 1518c are stored on the aerosol generation device 102.

Figure 15B:
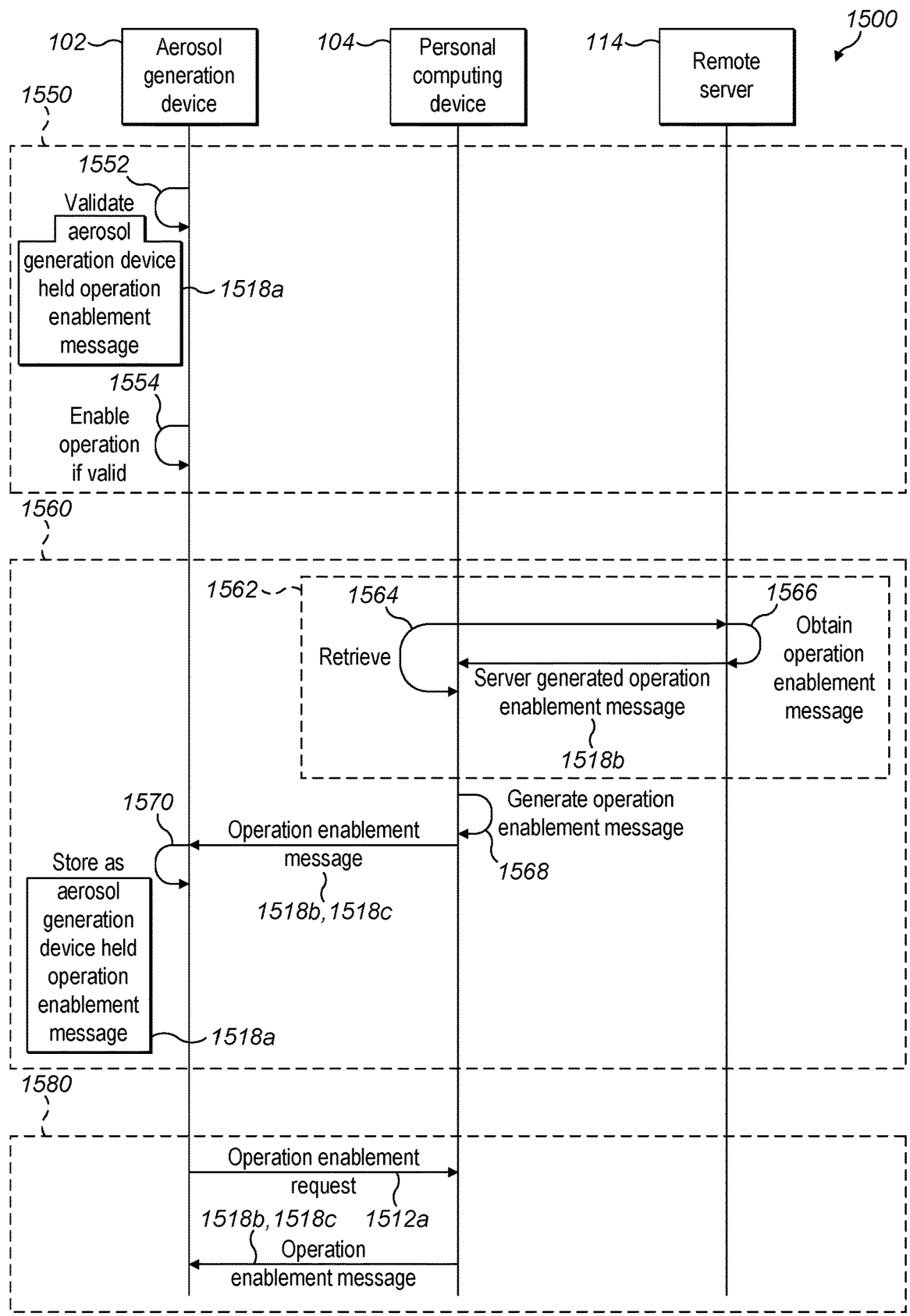

With the aerosol generation device held operation enablement message 1518a present, the enabling can occur as discussed with reference to the enabling process 1550 of FIG. 15B.

In a further embodiment, if aerosol generation device held operation enablement message 1518a is found to be invalid the aerosol generation device 102 transmits an aerosol generation device originating operation enablement request 1512a to the personal computing device 104. The process 1580 can also broadly be considered as an "updating" process to update invalid the generation device held operation enablement message 1518a with a valid one.

In this example, the aerosol generation device held operation enablement message 1518a is invalid because the time period of validity has expired. Alternatively, there are other reasons for the aerosol generation device held operation enablement message 1518a to be invalid. The reasons may be any one or more of the following: incorrect cryptographic information, incorrect versioning, incorrect user details, and/or incorrect user age.

In response to receiving the aerosol generation device originating operation enablement request 1512a, the personal computing device 104 transmits either a server generated operation enablement message 1518b or the personal computing device operation enablement message 1518c to the aerosol generation device 102. Optionally, the personal computing device 104 goes through the operation enablement message obtaining process 1560 as described with reference to FIG. 15B (above) to obtain the server generated operation enablement message 1518b or the personal computing device operation enablement message 1518c. Optionally, the personal computing device 104 has the server generated operation enablement message 1518b or the personal computing device operation enablement message 1518c cached on the personal computing device 104.

Opening the short-range wireless communication connection 116 is conducted as described with reference to FIGS. 6 to 8. Opening the short-range wireless communication connection 116 between the aerosol generation device 102 and a personal computing device 104 involves first determining the aerosol generation device 102 to which to connect. A consumer device identifier corresponding to the aerosol generation device 102 is received at the PWA 322. In the present embodiment, the PWA 322 retrieves the consumer device identifier from the local storage 318 of the web browser 316, the consumer device identifier corresponding to the determined aerosol generation device 102. With the received consumer device identifier, the PWA 322 causes the personal computing device 104 to initiate the short-range wireless communication connection 116 to the aerosol generation device 102 associated with the consumer device identifier. In this embodiment, the consumer device identifier is the Bluetooth® MAC address and is used to initiate the short-range wireless communication connection 116.

In the present embodiment, an operation to be enabled in the enable operation steps 906, 1014, 1520 is the turning on of the heating element 210. With the operation enabled 906, 1014, 1520, a user is able to turn on the heating element 210 and therefore generate aerosol.

The aerosol generation device 102 receives the operation enablement message 1518. In the present embodiment, the operation is turning on the heating element 210.

In this embodiment, the operation enablement message 1518, 1518a, 1518b, 1518c further comprises an operation enablement instruction. The operation enablement instruction comprises data indicative of the operation to be enabled. The operation to be enabled is any one or more of the following:
  permitting turning on the heating element 210,
  permitting consumables that contain nicotine in the consumables module 222,
  permitting the heating element 210 to turn on if the consumable in the consumables module 222 contains nicotine,
  permitting the user interface 212 to be turned on,
  turning on the user interface 212, or
  receiving user inputs from the user interface buttons 220.

In an alternative embodiment, after the aerosol generation device 102 has received the operation enablement message 1518 and successfully enabled an operation of the aerosol generation device 102, the operation of the aerosol generation device 102 remains enabled forever. In this alternative embodiment, there is no disablement except for before the aerosol generation device 102 is enabled.

In an alternative embodiment, the personal computing device 104 sends operation enablement requests 1512 to the remote server 114 without receiving aerosol generation device originating operation enablement requests 1512a from the aerosol generation device 102. The server generated operation enablement messages 1518b received in response to the operation enablement requests 1512 from the remote server 114 are stored on the personal computing device 104. The stored server generated operation enablement messages 1518b can sent to the aerosol generation device 102 in response to the aerosol generation device 102 sending the operation enablement request 1512. An advantage of this alternative embodiment is that when the aerosol generation device 102 sends an aerosol generation device originating operation enablement request 1512a to the personal computing device 104, the personal computing device 104 should always have a valid operation enablement message 1518 stored to reply back to the aerosol generation device 102 with. This alternative embodiment provides an improved user experience by lowering the chances that the user will have to connect the personal computing device 104 to the Internet 112 for an up to date and/or valid operation enablement message to be downloaded. The personal computing device 104 sends operation enablement requests 1512 to the remote server 114 asynchronously from any operation of the aerosol generation device 102. In this alternative embodiment, the personal computing device 104 periodically sends operation enablement requests 1512 to the remote server 114. In this embodiment, the period is between hourly and daily. More specifically, the period is daily. If the personal computing device 104 is not connected to the Internet 112 when the operation enablement requests 1512 is triggered to send, the sending of the operation enablement requests 1512 to the remote server 114 is delayed until the personal computing device 104 is connected to the Internet 112. Alternatively, the aerosol generation device 102 sends aerosol generation device originating operation enablement requests 1512a asynchronously from any operation of the aerosol generation device 102. In this embodiment, the period is between hourly and daily. More specifically, the period is daily. If the aerosol generation device 102 is not connected to the personal computing device 104 when the aerosol generation device originating operation enablement requests 1512a is triggered to send, the sending of the aerosol generation device originating operation enablement requests 1512a is delayed until the aerosol generation device 102 is connected to the personal computing device 104.

As described with reference to the receiving and storing process 1560 of the operation enablement message 1518a, 1518b, 1518c in FIG. 15B, the personal computing device 104 is configured to enable an operation of the aerosol generation device 102 using a personal computing device generated operation enablement message 1518c. This personal computing device generated operation enablement message 1518c is generated at the personal computing device 104 and as such is not digitally signed by the remote server 114. The personal computing device generated operation enablement message 1518c is used to enable and/or disable an operation of the aerosol generation device 102 without connection or data from the remote server 114. The personal computing device generated operation enablement message 1518c does not comprise verifiable data from the remote server 114. When the aerosol generation device 102 receives the personal computing device generated operation enablement message 1518c, an operation of the aerosol generation device 102 will be enabled as if it were a regular operation enablement message 1518. The personal computing device generated operation enablement message 1518c is sent from the personal computing device 104 when a user interacts with the PWA 322. This way, a user must have access to both the personal computing device 104 and the aerosol generation device 102 to enable a function of the aerosol generation device 102 and use it.

The PWA 322 further provides a method for a user to disable the operation of the aerosol generation device 102. The operation of the aerosol generation device 102 is also disabled using the main embodiment's period of time disable method 1000.

In an alternative embodiment, the personal computing device generated operation enablement message 1518c can further behave as a lower security temporary lock. The present alternative embodiment is considered a "child lock" system such that children, or people under the age of the legal smoking age, cannot use the disabled or "locked" aerosol generation device 102 without access to the primary user's personal computing device 104. In this alternative, personal computing device generated operation enablement message 1518c is a child lock/unlock message. In a further alternative embodiment, the PWA 322, provides a password interface or unlock interface, before allowing the user of the personal computing device 104 to "unlock" or enable an operation of the aerosol generation device 102. The password interface may be any one or more of the following interfaces:

PIN input,
Alphanumeric password input,
Keyboard password input,
Facial recognition input, and/or
Pattern input.

The user selects which password interface they prefer to use. The password interfaces are familiar to the user as they are commonly used password interfaces used for unlocking smartphones and tablets.

In the present embodiment, one private/public key pair is generated on the remote server 114. That one public key is installed on every aerosol generation device 102. The public key is stored on every aerosol generation device 102 during the aerosol generation device 102 manufacturing. In an alternative embodiment, the aerosol generation device 102 receives the public key later via the personal computing device 104 downloading it from the remote server 114. In this alternative embodiment, the public key is sent to the aerosol generation device 102 once the user has registered an account on the remote server 114

In an alternative embodiment, multiple private/public key pairs are generated. Every public key generated is stored on the aerosol generation device 102. In this way, the verifiable data is per-user, or specific to the user unlocking the device. In this embodiment, multiple remotes servers 114 are present and all allow the enablement of the operation of the aerosol generation device 102. Each public key corresponds to a different remote server 114. When the aerosol generation device 102 receives the aerosol generation device held operation enablement message 1518a, the aerosol generation device held operation enablement message 1518a and associated verifiable data is verified against each stored public key. If the aerosol generation device held operation enablement message 1518a was signed by any of the remote servers 114, the aerosol generation device held operation enablement message 1518a will be verified as originating from a valid remote server 114.

In an further embodiment, a mechanism to revoke the public key is used. The public key will need to be revoked if the private key is compromised or access to the private key lost. In this alternative embodiment, a certificate revocation list (CRL) is used to manage public key revocations. The CRL is a list of all digital certificates that have been revoked and should not be trusted. RFC 5280 provides a proposed standard for operation of a CRL. In this alternative embodiment, the aerosol generation device 102 accesses the CRL to determine whether the public key in use has been revoked and is valid. If no public keys stored on the aerosol generation device 102, the aerosol generation device 102 will request new verification information from the remote server 114. Alternatively, the Online Certificate Status Protocol (OCSP) is used in place of the CRL. In another alternative embodiment, the public key is updated via a firmware update. The firmware update contains new public key(s).

In an alternative embodiment, the aerosol generation device 102 is configured, before the operation of the aerosol generation device 102 is disabled 1008, 1534, to send an aerosol generation device originating operation enablement request 1512a. The aerosol generation device 102 receives an operation enablement message 1518, 1518a, 1518b, 1518c in response. The operation of the aerosol generation device 102 is enabled for another period of time. In particular, the disable timer is reset such that the disable step 1008, 1534 does not occur for another full period of the timer. The advantage of this alternative embodiment is that the aerosol generation device 102 will have zero time in a disabled state, presuming the aerosol generation device 102 receives valid and correct device enablement messages 1518. Having zero time disabled is a preferable user experience as the user will be provided with uninterrupted and seamless smoking experience while still being authenticated and confirmed to be of age. In particular, the aerosol generation device 102 will transmit an aerosol generation device originating operation enablement request 1512a one hour before the disable timer is due to time out. If the aerosol generation device 102 receives an invalid or incorrect device enablement message 1518 and/or the operation of the aerosol generation device 102 will not be enabled for any other reason, the aerosol generation device 102 alerts the user. To alert the user, the aerosol generation device 102 displays a warning message on the display 218 of the user interface 212 of the aerosol generation device 102. Alternatively, the aerosol generation device 102 sends a warning message to the personal computing device 104 and the personal computing device 104 is configured to alert the user.

In another embodiment, the remote server 114, sends an operation disablement message to the aerosol generation device 102 via the personal computing device 104. The aerosol generation device 102, receives the operation disablement message and disable the operation of the device. The operation disablement message comprises verifiable data so that the aerosol generation device 102 can verify the message in a similar method as described with reference to the operation enablement message 1518 verification process. The operation disablement message further comprises an operation disablement instruction, where the instruction is indicative of which operation of the aerosol generation device 102 to disable. The operations that could be disabled are the same as those that can be enabled as described previously. In a further embodiment, the operation disablement message also comprises instructions to display to a user. The instructions are displayed on the display 218 of the user interface 212 of the aerosol generation device 102. The instructions describe how to enable the aerosol generation device 102 to the user.

In an alternative embodiment, the public key generated by the remote server 114 and pre-installed on the aerosol generation device 102 is used to encrypt any arbitrary data. Any arbitrary data encrypted using the public key from the remote server 114 is only able to be decrypted using the private key of the pair which was previously generated and stored only on the remote server 114. Not even the aerosol generation device 102 that encrypted the data may decrypt the data encrypted using this method. Messages or requests sent from the aerosol generation device 102 with a final destination of the remote server 114 are encrypted using this method such that any third parties, or the personal computing device 104, cannot read the contents of the message or request. Data that is not relevant to the operation of the aerosol generation device 102 is encrypted using the public key. The original data is then removed from the aerosol generation device 102 such that only the remote server 114 with the private key can recreate or access the original data. In this way, the data is encrypted at rest. By encrypting the data at rest, if the aerosol generation device 102 is stolen or compromised, a third party cannot access any of the original data, unless they have the server private key. The original data includes any one or more of the following:

Personal user data,

Sensitive information,

Location of user of aerosol generation device 102,

Time and duration of user of aerosol generation device 102,

Type of consumable used in the consumables module 222, and

Historical aerosol generation device 102 settings.

Figure 16:
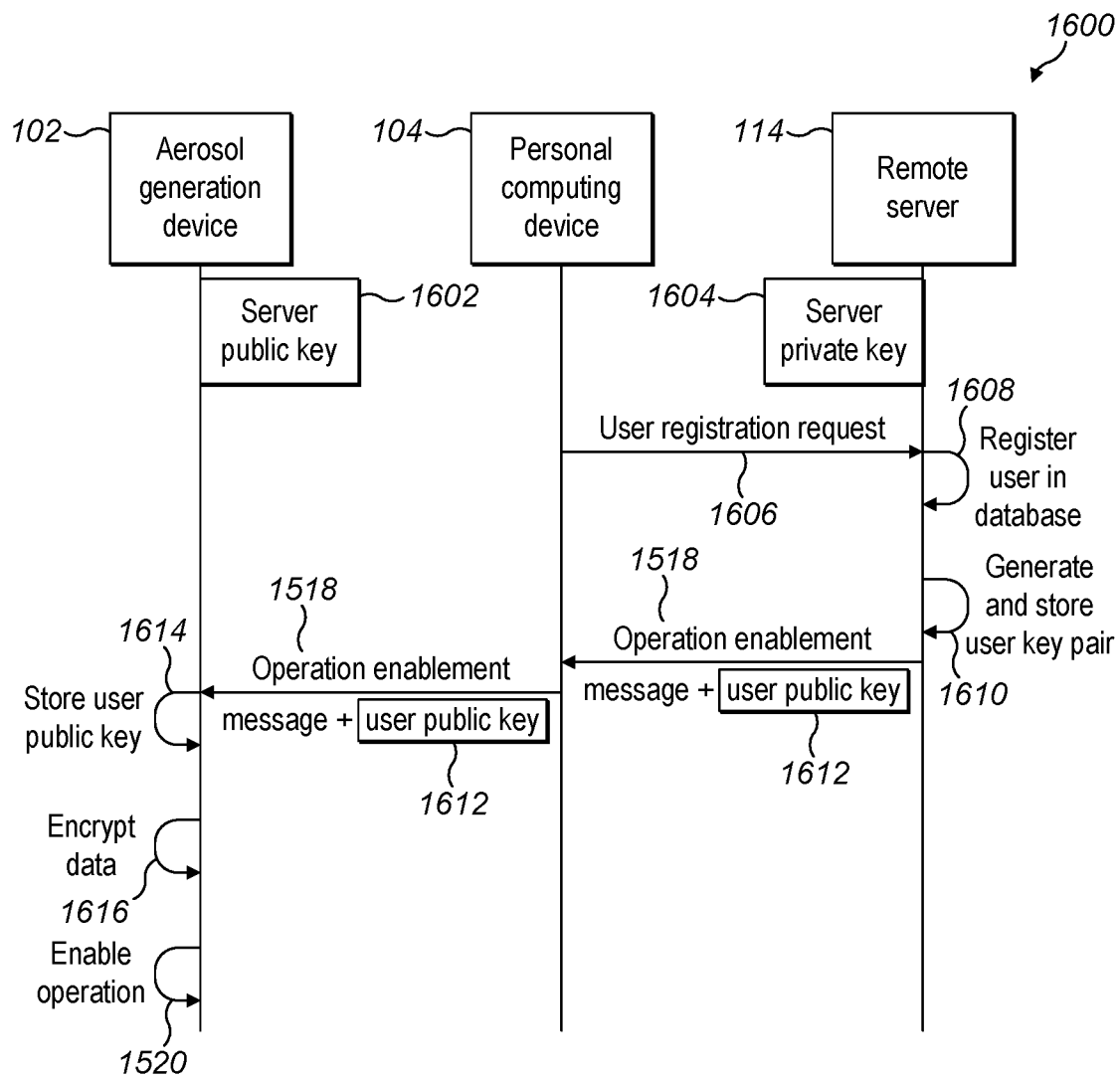
FIG. 16 is a schematic diagram illustrating exchange of verification information between the aerosol generation device, personal computing device and remote server during the authentication.

Referring to FIG. 16, a schematic diagram 1600 showing data communication and inputs between devices is shown. The schematic diagram 1600 shows an alternative embodiment of generating and sharing per-user public/private key pairs. The aerosol generation device 102 has the server public key 1602 stored and the remote server 1604 has the server private key 1604 stored. The personal computing device 104 generates a user registration request 1606. The method for generating the user registration request in this embodiment is substantially the same as the method 1100 described with reference to FIG. 11 except that the during the registration process 1608 at the remote server 114, a further public/private key pair is generated 1610 and associated with the user. The user private key is stored in the user database. Alternatively, a reference to the location of the user private key is stored in the user database and the cryptography controller 420 is configured to retrieve the user private key. The remote server 114 sends the server generated operation enablement message 1518*b* and the user public key 1612 to the personal computing device 104. Alternatively, only the user public key 1612 is sent to the personal computing device 104. The personal computing device 104 receives the server generated operation enablement message 1518*b* and the user public key 1612. The personal computing device 104 sends the server generated operation enablement message 1518*b* and the user public key 1612 to the aerosol generation device 102. The aerosol generation device 102 stores 1614 the user public key 1612. The aerosol generation device 102 enables 1520 the operation of the aerosol generation device 102. The aerosol generation device 102 is configured to encrypt 1616 arbitrary data using the user public key 1612. Any arbitrary data encrypted using the user public key 1612 is only able to be decrypted using the user private key which is generated and stored only on the remote server 114. Not even the aerosol generation device 102 that encrypted the data may decrypt the data encrypted using this method. Messages or requests sent from the aerosol generation device 102 with a final destination of the remote server 114 are encrypted using this method such that any third parties, or the personal computing device 104, cannot read the contents of the message or request.

Figure 17:
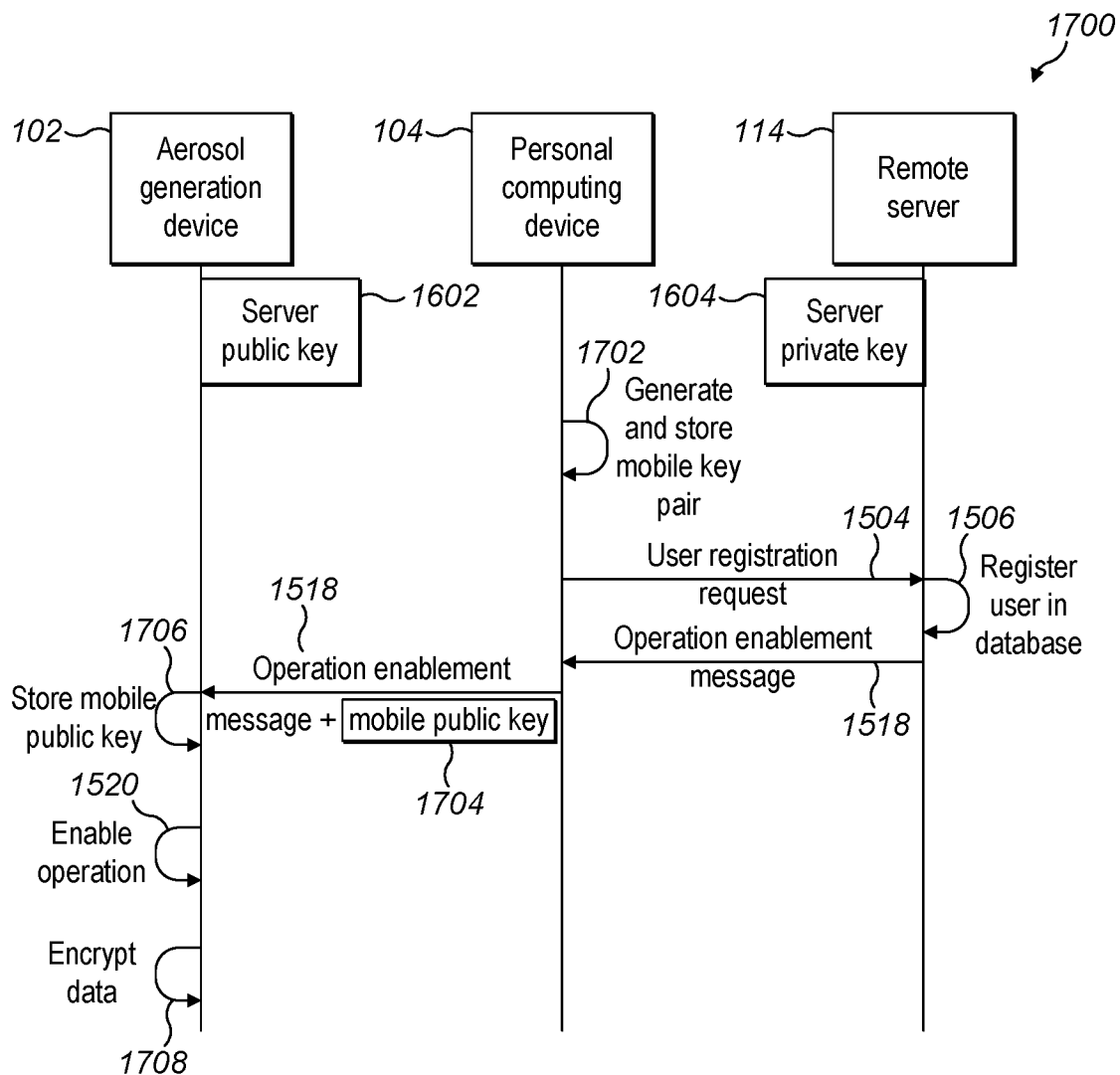
FIG. 17 is a schematic diagram illustrating an alternative exchange of verification information between the aerosol generation device, personal computing device and remote server during the authentication.

Referring to FIG. 17, a schematic diagram 1700 showing data communication and inputs between devices is shown. The schematic diagram 1700 shows an alternative embodiment of generating and sharing per-user public/private key pairs. The aerosol generation device 102 has the server public key 1602 stored and the remote server 1604 has the server private key 1604 stored. The personal computing device 104 generates 1702 a public/private key pair. The personal computing device 104 stores at least the private key. The personal computing device 104 generates a user registration request 1606. The method for generating the user registration request in this embodiment is substantially the same as the method 1100 described with reference to FIG. 11. When receiving the operation enablement request 1504, the remote server 114 registers 1506 the user in the user database 408. The remote server then sends the server generated operation enablement message 1518*b* back to the personal computing device 104. The personal computing device sends the server generated operation enablement message 1518*b* and the mobile public key 1704 to the aerosol generation device 102. The aerosol generation device 102 stores 1706 the mobile public key 1704. The aerosol generation device 102 enables 1520 the operation of the aerosol generation device 102. The aerosol generation device 102 is configured to encrypt 1708 arbitrary data using the mobile public key 1704. Any arbitrary data encrypted using the mobile public key 1704 is only able to be decrypted using the user private key which is generated and stored only on the personal computing device 104. Not even the aerosol generation device 102 that encrypted the data may decrypt the data encrypted using this method. Messages or requests sent from the aerosol generation device 102 to the personal computing device 104 are encrypted using this method such that any third parties cannot read the contents of the message or request.

Figure 18:
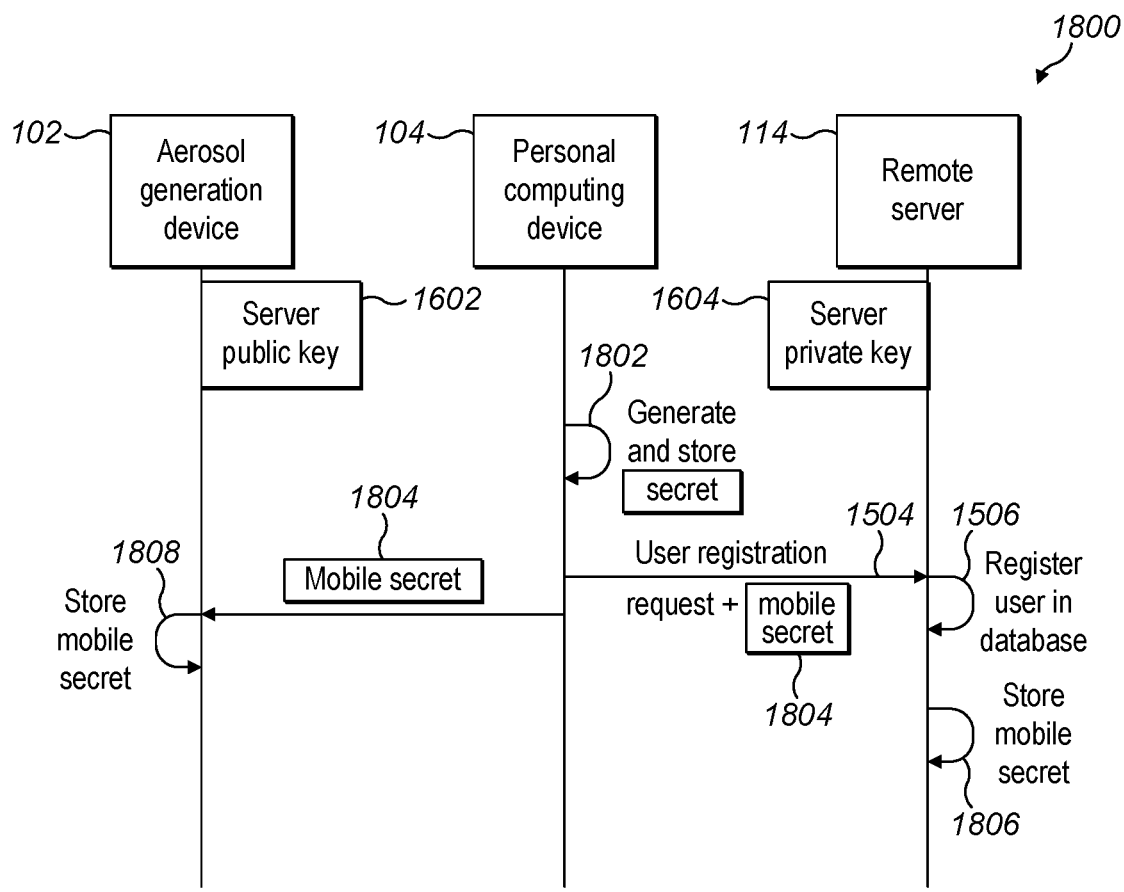
FIG. 18 is a schematic diagram illustrating an alternative embodiment of sharing cryptography information for encrypting communications.

Referring to FIG. 18, a schematic diagram 1800 showing data communication and inputs between devices is shown. The schematic diagram 1800 shows an alternative embodiment of sharing cryptography information for encrypting communications. In this alternative embodiment, the personal computing device 104 generates and stores 1802 a mobile secret 1804. The mobile secret 1804 is a randomly generated password. Alternatively, the mobile secret 1804 is a passphrase, a big number, a user generated password, a randomly generated integer of sufficient size, or an array of random bytes. This alternative embodiment can be described as a "shared secret" arrangement because the mobile secret 1804 is generated by the personal computing device 104 and shared with at least one of the aerosol generation device 102 and the remove server 114. Preferably, the mobile secret 1804 or shared secret is shared with all devices the personal computing device 104 is communicating with relating to the aerosol generation device 102 or operation of the aerosol generation device 102. The mobile secret 1804 is sent by the personal computing device 104 to the aerosol generation device 102. The aerosol generation device 102 stores 1808 the mobile secret 1804. The mobile secret 1804 is sent by the personal computing device 104 to the remote server 114 as part of the user registration request 1504. The remote server 114 registers the user 1506 and stores 1806 the mobile secret 1804. With the mobile secret 1804 shared between the aerosol generation device 102, personal computing device 104, and the remote server 114, any arbitrary data can be encrypted using the mobile secret 1804 to generate encrypted data. Any device with the mobile secret 1804 can decrypt the encrypted data to produce the original arbitrary data. The arbitrary data can be any of the operation enablement requests 1512, 1512*a*, the operation enablement messages 1518, 1518*a*, 1518*b*, 1518*c*, firmware updates, and other sundry aerosol generation device 102 information.

Legislation surrounding aerosol generation devices is changing and adapting in response to users' needs, wants, and their health. Flexibility in the technologies surrounding aerosol generation device(s) 102 is needed to accommodate changes in legislation without significant burden on users or manufacturers of the aerosol generation device(s) 102.

The described embodiments of the invention are only examples of how the invention may be implemented. Modifications, variations and changes to the described embodiments will occur to those having appropriate skills and knowledge. These modifications, variations and changes may be made without departure from the scope of the claims.

The invention claimed is:

1. A method for enabling an operation of an aerosol generation device, comprising the steps of:
   attempting to obtain a server generated operation enablement message,
   transmitting the server generated operation enablement message to the aerosol generation device if the server generated operation enablement message is obtained, and
   generating a personal computing device generated operation enablement message and transmitting the personal computing device generated operation enablement message to the aerosol generation device if the server generated operation enablement message is not obtained,
   wherein the server generated operation enablement message comprises one or more of a digital signature, a private key of a private/public key pair, operation enablement instruction, or an unlocking message, and
   wherein the method further comprises verifying at the aerosol generation device verifiable data of the server generated operation enablement message.

2. The method of claim 1, wherein the server generated operation enablement message remains valid for a first period of time and the personal computing device generated operation enablement message remains valid for a second period of time, the first period of time being longer than the second period of time.

3. The method of claim 1, further comprising the step:
   storing the server generated operation enablement message if successfully obtained.

4. The method of claim 1, further comprising the steps of:
   receiving an aerosol generation device originating operation enablement request; and in response transmitting the server generated operation enablement message or the personal computing device generated operation enablement message to the aerosol generation device.

5. The method of claim 1, further comprising the steps of:
   providing an unlock interface to a user; and
   upon the user successfully unlocking the unlock interface, transmitting the personal computing device generated operation enablement message to the aerosol generation device.

6. The method of claim 1, wherein the step of attempting to obtain the server generated operation enablement message comprises transmitting an operation enablement request to a remote server.

7. The method of claim 1, wherein the server generated operation enablement message and/or the personal computing device generated operation enablement message comprise data indicative of a time to be valid for.

8. The method of claim 1, further comprising the steps:
   receiving, at the aerosol generation device, and using the server generated operation enablement message or the personal computing device generated operation enablement message as an aerosol generation device held operation enablement message;
   determining whether the aerosol generation device held operation enablement message is valid or invalid, and
   enabling the operation if the aerosol generation device held operation enablement message is determined to be valid.

9. The method of claim 1, further comprising the step:
   disabling the operation of the aerosol generation device, wherein the disabling of the operation of the aerosol generation device is performed at an end of a period of time commencing from a time at which the operation of the aerosol generation device is enabled.

10. The method of claim 6, further comprising the steps:
    receiving the operation enablement request;
    authenticating a user of the aerosol generation device;
    generating the server generated operation enablement message;
    digitally signing the server generated operation enablement message such that the server generated operation enablement message comprises verifiable data; and
    transmitting the server generated operation enablement message such that the operation of the aerosol generation device is enabled when the aerosol generation device determines that the verifiable data of the server generated operation enablement message is authentic.

11. The method of claim 1, wherein the server generated operation enablement message is stored on a personal computing device, and wherein the server generated operation enablement message is stored in a browser storage of a web browser of the personal computing device.

12. The method of claim 6, further comprising the steps of:
    on the remote server;
    receiving the operation enablement request to generate the server generated operation enablement message;
    authenticating a user of the aerosol generation device;
    generating the server generated operation enablement message;
    digitally signing the server generated operational enablement message such that the server generated operational enablement message comprises verifiable data; and
    transmitting the server generated operation enablement message.

13. The method of claim 12, wherein the operation enablement request to generate the server generated operation enablement message comprises data indicative of an age of a user of the aerosol generation device.

14. The method of claim 1, wherein the server generated operation enablement message comprises verification information and/or verifiable data.

15. The method of claim 14, wherein the verification information comprises a public key of a public/private key pair and the verifiable data comprises a digital signature signed using a private key of the public/private key pair.

16. The method of claim 15, wherein the public/private key pair is a public/private key pair generated at a remote server.

17. The method of claim 11, further comprising the steps of:
    on the personal computing device:
    launching a progressive web application on the web browser;

accessing the browser storage of the web browser, the browser storage storing one or more consumer apparatus identifiers each corresponding to a candidate aerosol generation device;

determining one of the candidate consumer apparatus as the selected aerosol generation device with which to open a short-range wireless communication connection;

receiving the consumer apparatus identifier corresponding to the selected aerosol generation device and causing the personal computing device to open the short-range wireless communication connection between the personal computing device and the selected aerosol generation device using the received consumer apparatus identifier corresponding to the selected aerosol generation device.

18. The method of claim 17, wherein the personal computing device receives, from the selected aerosol generation device, an indication of a functioning of the selected aerosol generation device via the short-range wireless communication connection.

19. The method of claim 18, further comprising the step of:

on the personal computing device:

transmitting the indication of the functioning of the selected aerosol generation device to a remote server via a long-range communication connection.

20. The method of claim 19, further comprising the steps of:

prior to transmitting the indication of the functioning of the selected aerosol generation device to the remote server:

determining whether the long-range communication connection is available to the personal computing device; and in response to determining that the long-range communication connection is available to the personal computing device, causing the long-range communication connection to be set up between the personal computing device and the remote server.

* * * * *